US010951847B2

(12) United States Patent
Kang et al.

(10) Patent No.: US 10,951,847 B2
(45) Date of Patent: *Mar. 16, 2021

(54) ELECTRONIC DEVICE AND METHOD FOR GENERATING IMAGE DATA

(71) Applicant: Samsung Electronics Co., Ltd., Suwon-si (KR)

(72) Inventors: Hwa-Young Kang, Suwon-si (KR); Dong-Soo Kim, Suwon-si (KR); Moon-Soo Kim, Seoul (KR); Young-Kwon Yoon, Seoul (KR); Dong-Hoon Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,357

(22) Filed: Dec. 28, 2018

(65) Prior Publication Data

US 2019/0141271 A1    May 9, 2019

Related U.S. Application Data

(63) Continuation of application No. 15/286,083, filed on Oct. 5, 2016, now Pat. No. 10,200,646.

(30) Foreign Application Priority Data

Oct. 5, 2015 (KR) .................. 10-2015-0139712

(51) Int. Cl.
*H04N 5/378* (2011.01)
*H04N 5/232* (2006.01)
(Continued)

(52) U.S. Cl.
CPC ......... *H04N 5/378* (2013.01); *H04N 5/23212* (2013.01); *H04N 5/23245* (2013.01);
(Continued)

(58) Field of Classification Search
CPC .. H04N 5/378; H04N 5/3696; H04N 5/23212; H04N 5/36961; H04N 5/232122;
(Continued)

(56) References Cited

U.S. PATENT DOCUMENTS 10,200,646 B2 * 2/2019 Kang .................. H04N 5/3765
2011/0285866 A1 * 11/2011 Bhrugumalla ..... H04N 5/23235
348/218.1
(Continued)

FOREIGN PATENT DOCUMENTS

CN    101170644 A    4/2008
CN    102422631 A    4/2012
(Continued)

OTHER PUBLICATIONS

European Search Report dated Dec. 3, 2018 issued in EP Application No. 16853854.4.
(Continued)

*Primary Examiner* — Nhan T Tran
(74) *Attorney, Agent, or Firm* — Jefferson IP Law, LLP

(57) ABSTRACT

A method of an electronic device including an image sensor that acquires an optical signal corresponding to an object and a controller that controls the image sensor, is provided. The method includes identifying a mode for generating an image corresponding to the object by using the optical signal, determining a setting of at least one image attribute to be used for generating the image at least based on the mode, generating image data by using pixel data corresponding to the optical signal at least based on the setting, and displaying the image corresponding to the object through a display functionally connected to the electronic device at least based on the image data.

20 Claims, 19 Drawing Sheets

(51) Int. Cl.
  *H04N 5/3745* (2011.01)
  *H04N 9/04* (2006.01)
  *H04N 5/369* (2011.01)
  *H04N 5/376* (2011.01)

(52) U.S. Cl.
  CPC ..... *H04N 5/232122* (2018.08); *H04N 5/3696* (2013.01); *H04N 5/36961* (2018.08); *H04N 5/3765* (2013.01); *H04N 5/37457* (2013.01); *H04N 9/04* (2013.01); *H04N 9/045* (2013.01); *H04N 9/04515* (2018.08); *H04N 9/04557* (2018.08); *H04N 5/23241* (2013.01)

(58) Field of Classification Search
  CPC ............... H04N 9/045; H04N 5/37457; H04N 5/23245; H04N 9/04; H04N 5/3765
  See application file for complete search history.

(56) References Cited

U.S. PATENT DOCUMENTS

| | | |
|---|---|---|
| 2012/0038768 A1 | 2/2012 | Fujimori |
| 2012/0194696 A1 | 8/2012 | Ohshitanai et al. |
| 2012/0257091 A1 | 10/2012 | Kim |
| 2013/0057744 A1 | 3/2013 | Minagawa et al. |
| 2013/0107067 A1* | 5/2013 | Miyakoshi ......... H04N 5/23212 348/208.5 |
| 2013/0235253 A1* | 9/2013 | Onuki .................. H04N 5/3696 348/349 |
| 2014/0022446 A1 | 1/2014 | Endo et al. |
| 2014/0028895 A1* | 1/2014 | Endo .................. H04N 5/23212 348/348 |
| 2015/0009383 A1* | 1/2015 | Fujii ..................... H04N 5/347 348/302 |
| 2015/0055011 A1 | 2/2015 | Aoki |
| 2015/0195473 A1 | 7/2015 | Inoue et al. |
| 2015/0237253 A1 | 8/2015 | Shimokawa et al. |
| 2015/0312471 A1 | 10/2015 | Kosaka et al. |
| 2015/0319420 A1* | 11/2015 | Fettig ................. H04N 5/23212 348/49 |
| 2017/0064199 A1 | 3/2017 | Lee et al. |
| 2017/0064226 A1* | 3/2017 | Ishii ....................... H04N 5/361 |

FOREIGN PATENT DOCUMENTS

| | | |
|---|---|---|
| CN | 102739942 A | 10/2012 |
| CN | 104135607 A | 11/2014 |
| CN | 104272161 A | 1/2015 |
| CN | 104641276 A | 5/2015 |
| JP | 09-331445 A | 12/1997 |
| WO | 2015/126060 A1 | 8/2015 |

OTHER PUBLICATIONS

Chinese Office Action dated Oct. 12, 2019, issued in Chinese Patent Application No. 201680058394.3.

* cited by examiner

|   |   |   |   |   |   |   |   |
|---|---|---|---|---|---|---|---|
| R | R | G | G | R | R | G | G |
| G | G | B | B | G | G | B | B |
| R | R | G | G | R | R | G | G |
| G | G | B | B | G | G | B | B |

FIG.8A

|   |   |   |   |   |   |   |   |
|---|---|---|---|---|---|---|---|
| R | R | G | G | R | R | G | G |
| R | R | G | G | R | R | G | G |
| G | G | B | B | G | G | B | B |
| G | G | B | B | G | G | B | B |
| R | R | G | G | R | R | G | G |
| R | R | G | G | R | R | G | G |
| G | G | B | B | G | G | B | B |
| G | G | B | B | G | G | B | B |

FIG.8B

ELECTRONIC DEVICE AND METHOD FOR GENERATING IMAGE DATA

CROSS-REFERENCE TO RELATED APPLICATION(S)

This application is a continuation application of prior application Ser. No. 15/286,083, filed on Oct. 5, 2016, which claimed priority under 35 U.S.C § 119(a) of a Korean patent application number 10-2015-0139712, filed on Oct. 5, 2015, in the Korean Intellectual Property Office, the disclosure of which is incorporated by reference herein in its entirety.

TECHNICAL FIELD

The present disclosure relates to an apparatus and a method for generating image data in an electronic device. More particularly, aspects of the present disclosure are related to an apparatus and method for generating image data by an image sensor having an image pixel array.

BACKGROUND

The number of various services and additional functions provided by an electronic device are gradually increasing. In order to increase the effective value of the electronic device and meet various demands of users, various applications that are executable by the electronic device have been developed.

The electronic device may photograph an object through a camera installed in the electronic device, and the camera may include an image sensor that detects the object. The electronic device may detect an object or an image through, for example, the image sensor. The image sensor may be configured, for example, in the unit of a plurality of pixels, and each pixel unit may consist of, for example, a plurality of subpixels. The image sensor may include an array of small photodiodes called, for example, pixels or photosites. For example, the pixel does not extract a color from light and may convert a photon of a wide spectrum band into an electron. Accordingly, the pixel of the image sensor may receive, for example, only the light of a band required for acquiring the color among lights of the wide spectrum band.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of generating image data by an image sensor having an image pixel array including a plurality of subpixel and a method of generating information for calculating a phase difference. An image sensor functionally connected to an electronic device may output signals of all subpixels and then separate phase difference information and image data, but may not effectively provide a maximum output of the image sensor. For example, processing signals output from all subpixels may increase power consumption.

In accordance with an aspect of the present disclosure, a method of an electronic device including an image sensor that acquires an optical signal corresponding to an object and a controller that controls the image sensor is provided. The method includes identifying a mode for generating an image corresponding to the object by using the optical signal, determining a setting of at least one image attribute to be used for generating the image at least based on the mode, generating image data by using pixel data corresponding to the optical signal at least based on the setting, and displaying the image corresponding to the object through a display functionally connected to the electronic device at least based on the image data.

In accordance with another aspect of the present disclosure, an electronic device is provided. The electronic device includes a display, an image sensor configured to acquire an optical signal corresponding to an object, and at least one processor. The at least one processor is configured to identify a mode for generating an image corresponding to the object by using the optical signal, determine a setting of at least one image attribute to be used for generating the image at least based on the mode, generate image data by using pixel data corresponding to the optical signal at least based on the setting, and display the image corresponding to the object through a display functionally connected to the electronic device at least based on the image data.

In accordance with another aspect of the present disclosure, an electronic device is provided. The electronic device includes an image sensor configured to acquire an optical signal corresponding to an object, the image sensor including a plurality of unit pixels, at least one of the plurality of unit pixels including a first subpixel and a second pixel, and at least one processor functionally connected to the image sensor. The at least one processor is configured to acquire pixel data corresponding to the object at least based on optical signal by using the image sensor, identify a setting of at least one image attribute to be used for generating an image corresponding to the object, determine a phase difference of the image by using a first signal corresponding to the first subpixel and a second signal corresponding to the second subpixel when the setting meets predetermined conditions, and refrain from determining the phase difference when the setting does not meet the predetermined conditions.

An electronic device and a method according to various embodiments of the present disclosure may output, for example, image data in the unit of subpixels or pixels according to a use mode of the user, thereby effectively using an image sensor. Further, an electronic device having an image sensor including at least two subpixels (for example, photodiodes) may output image data at a high frame rate or with low power, so that the user can use information and/or perform a function that the user desires and to improve the usability of the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8A illustrates an example in which a unit pixel of an image sensor includes two subpixels according to an embodiment of the present disclosure;

FIG. 8B illustrates an example in which a unit pixel of an image sensor includes four subpixels according to an embodiment of the present disclosure;

Throughout the drawings, it should be noted that like reference numbers are used to depict the same or similar elements, features, and structures.

DETAILED DESCRIPTION

Figure 1:
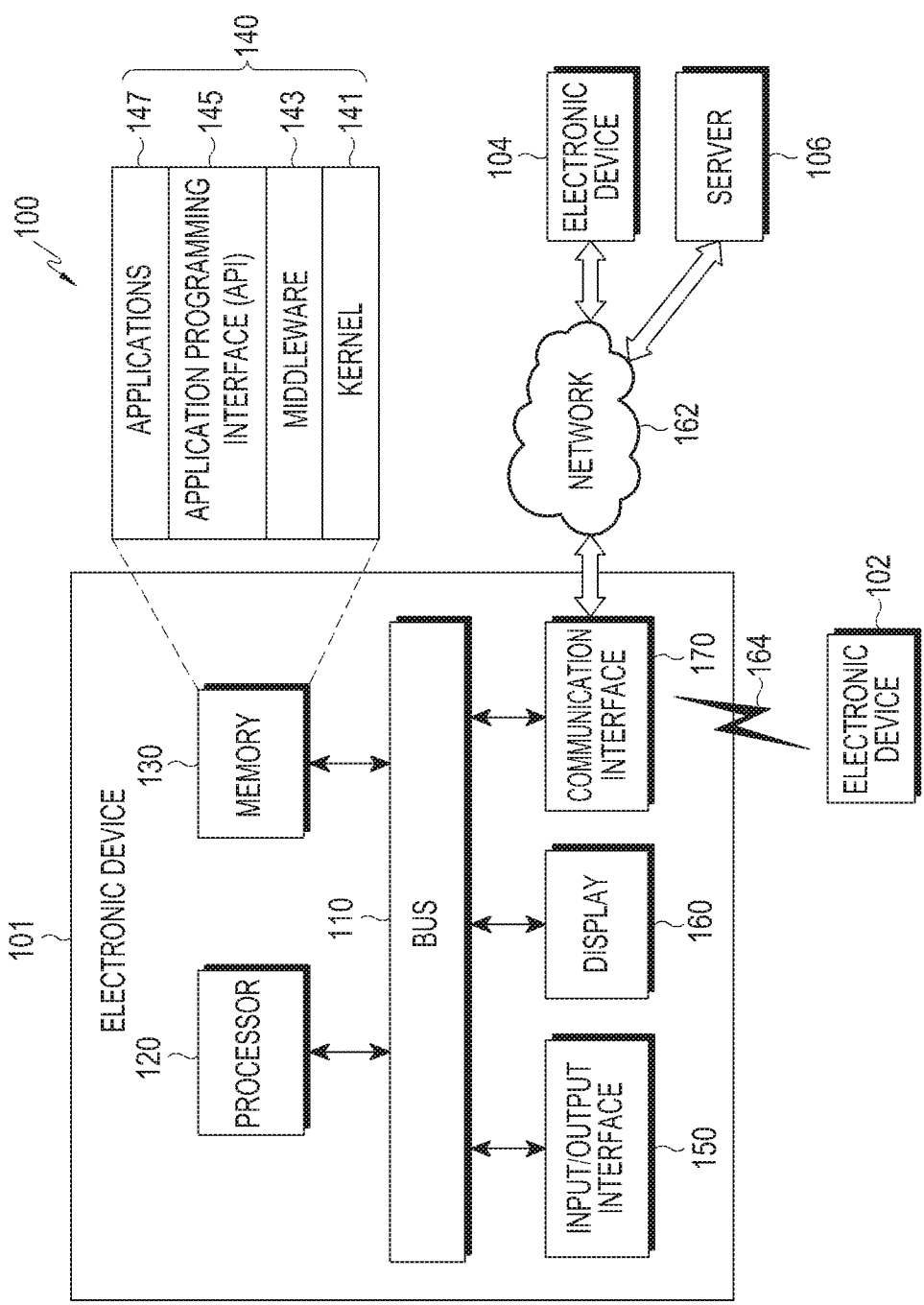
FIG. 1 illustrates an electronic device within a network environment 100, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. Similarly, a first element may be termed a second element, and a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), no elements (e.g., third element) are interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. The electronic device may also be a flexible device. The electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. In the present disclosure, the term "user" may indicate a person using an electronic device or a device (e.g., an artificial intelligence electronic device) using an electronic device.

FIG. 1 illustrates an electronic device within a network environment, according to an embodiment of the present disclosure.

Referring to FIG. 1, the electronic device 101 may operate within a network environment 100. The electronic device 101 may include a bus 110, a processor 120, a memory 130, an input/output interface 150, a display 160, and a communication module 170. In some embodiments, the electronic device 101 may omit at least one of the elements, or may further include other elements.

The bus 110 may include, for example, a circuit that interconnects the components 110 to 170 and delivers communications (for example, a control message and/or data) between the components 110 to 170.

The processor 120 may include one or more of a CPU, an AP, and a communication processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage the system resources (for example, the bus 110, the processor 120, the memory 130, etc.) that are used to execute operations or functions implemented in the other programs (for example, the middleware 143, the API 145, and the application programs 147). Furthermore, the kernel 141 may provide an interface through which the middleware 143, the API 145, or the application programs 147 may access the individual elements of the electronic device 101 to control or manage the system resources.

The middleware 143 may function as an intermediary for allowing the API 145 or the application programs 147 to communicate with the kernel 141 to exchange data.

The middleware 143 may process one or more task requests, which are received from the application programs 147, according to priorities thereof. For example, the middleware 143 may assign priorities for using the system resources (for example, the bus 110, the processor 120, the memory 130, etc.) of the electronic device 101 to one or more of the application programs 147. The middleware 143 may perform scheduling or loading balancing on the one or more task requests by processing the one or more task requests according to the priorities assigned to the one or more application programs.

The API 145, which is an interface through which the applications 147 control functions provided from the kernel 141 or the middleware 143, may include at least one interface or function (e.g., instruction) for file control, window control, image processing, text control, etc.

The input/output interface 150 may function as an interface that can forward instructions or data, which are input from a user or an external device, to the other element(s) of the electronic device 101. Furthermore, the input/output interface 150 may output the instructions or data received from the other component element(s) of the electronic device 101 to the user or another external device.

Examples of the display 160 may include a liquid crystal display (LCD), a light-emitting diode (LED) display, an organic light-emitting diode (OLED) display, a micro-electro-mechanical systems (MEMS) display, and an electronic paper display. The display 160 may display various types of content (e.g., text, images, videos, icons, symbols, etc.) for a user. The display 160 may include a touch screen and may receive a touch, gesture, proximity, or hovering input using an electronic pen or the user's body part.

The communication module 170 may configure communication between the electronic device 101 and an external device (e.g., a first external electronic device 102, a second external electronic device 104, or a server 106). The communication module 170 may be connected to a network 162 through wireless or wired communication to communicate with the external device (for example, the second external electronic device 104 or the server 106).

The wireless communication may use at least one of long term evolution (LTE), LTE-Advance (LTE-A), code division multiple access (CDMA), Wideband CDMA (WCDMA), universal mobile telecommunications system (UMTS), WiBro (Wireless Broadband), Global System for Mobile Communications (GSM), and the like, as a cellular communication protocol. In addition, the wireless communication may include short range communication 164. The short range communication 164 may include, for example, at least one of Wi-Fi, Bluetooth (BT), near field communication (NFC), global navigation satellite system (GNSS), etc. The GNSS may include at least one of a global positioning system (GPS), a global navigation satellite System (Glonass), a Beidou Navigation Satellite System (hereinafter referred to as "Beidou"), and a European Global Satellite-based Navigation System (Galileo), according to a use area, a bandwidth, or the like. In the present disclosure, "GPS" may be interchangeably used with "GNSS". The wired communication may include at least one of a universal serial bus (USB), a high definition multimedia interface (HDMI), Recommended Standard 232 (RS-232), a plain old telephone service (POTS), etc. The network 162 may include a telecommunication network, such as at least one of a computer network (e.g., a LAN or a WAN), the Internet, and a telephone network.

Each of the first and second external electronic devices 102 and 104 may be of the same or a different type from the electronic device 101. The server 106 may include a group of one or more servers. All or some of the operations executed in the electronic device 101 may be executed in another electronic device or a plurality of electronic devices (e.g., the electronic devices 102 and 104 or the server 106). When the electronic device 101 has to perform some functions or services automatically or in response to a request, the electronic device 101 may request another device (e.g., the electronic device 102 or 104 or the server 106) to perform at least some functions relating thereto instead of, or in addition to, performing the functions or services by itself. The other electronic device may perform the requested functions or the additional functions and may transfer the execution result to the electronic device 101. The electronic device 101 may provide the received result as it is, or may additionally process the received result to provide the requested functions or services. To this end, for example, cloud computing, distributed computing, or client-server computing technology may be used.

Figure 2:
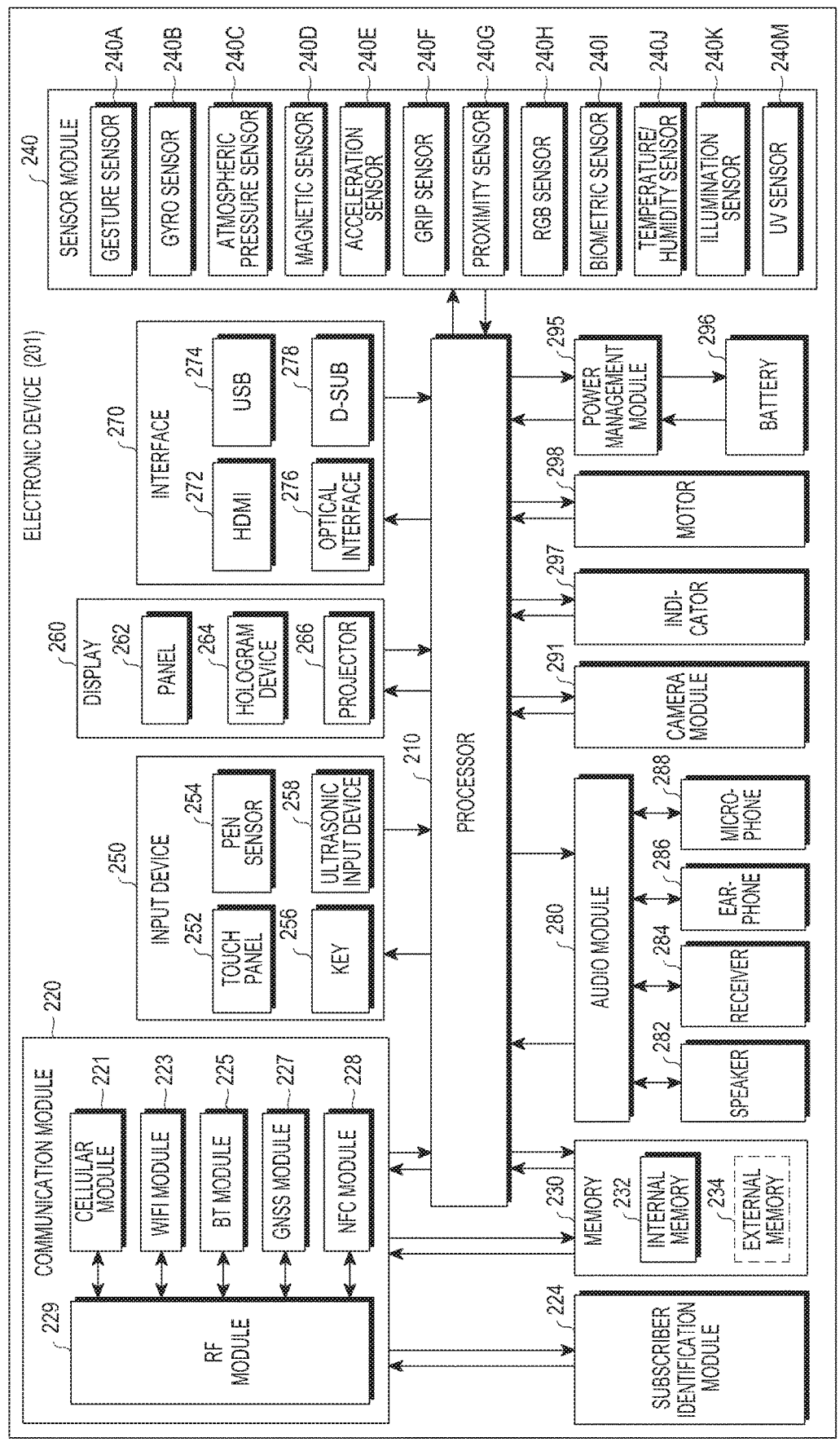
FIG. 2 is a block diagram of an electronic device according to an embodiment of the present disclosure.

FIG. 2 is a block diagram of an electronic device 201 according to an embodiment of the present disclosure.

Referring to FIG. 2, the electronic device 201 may include all or part of the electronic device 101 illustrated in FIG. 1. The electronic device 201 may include at least one AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may drive an OS or application programs to control a plurality of hardware or software elements connected thereto and may perform various types of data processing and operations. The processor 210 may be embodied as a system on chip (SoC). The processor 210 may further include a graphic processing unit (GPU) and/or an image signal processor. The processor 210 may also include at least some of the elements illustrated in FIG. 2 (e.g., the cellular module 221). The processor 210 may load, in a volatile memory, instructions or data received from at least one of the other elements (e.g., a non-volatile memory) to process the loaded instructions or data, and may store various types of data in the non-volatile memory.

The communication module 220 may have a configuration equal or similar to that of the communication module 170 of FIG. 1. The communication module 220 may include a cellular module 221, a Wi-Fi module 223, a BT module 225, a GNSS module 227 (for example, a GPS module, a Glonass module, a Beidou module, or a Galileo module), an NFC module 228, and a radio frequency (RF) module 229.

The cellular module 221 may provide, for example, a voice call, a video call, a text message service, an Internet service, etc. through a communication network. According to an embodiment, the cellular module 221 may identify and authenticate the electronic device 201 within a communication network using the subscriber identification module 224 (for example, a SIM card). The cellular module 221 may perform at least some of the functions that the processor 210 may provide. The cellular module 221 may include a CP.

The Wi-Fi module 223, the BT module 225, the GNSS module 227, or the NFC module 228 may each include a processor for processing data that is transmitted and received through the corresponding module. At least two or more of the cellular module 221, the Wi-Fi module 223, the BT module 225, the GNSS module 227, and the NFC module 228 may be included in one integrated chip (IC) or IC package.

The RF module 229 may transmit/receive a communication signal (for example, an RF signal). The RF module 229 may include a transceiver, a power amplifier module (PAM), a frequency filter, a low noise amplifier (LNA), an antenna, etc. According to another embodiment of the present disclosure, at least one of the cellular module 221, the Wi-Fi module 223, the BT module 225, the GNSS module 227, and the NFC module 228 may transmit/receive an RF signal through a separate RF module.

The subscriber identification module 224 may include a card including a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include an internal memory 232 and/or an external memory 234. The internal memory 232 may include at least one of a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, and the like), a hard disc drive, a solid state drive (SSD), and the like).

The external memory 234 may further include a flash drive, such as a compact flash (CF), a secure digital (SD), a micro secure digital (Micro-SD), a mini secure digital (Mini-SD), an eXtreme digital (xD), a multi-media card (MMC), a memory stick, and the like. The external memory 234 may be functionally and/or physically connected to the electronic device 201 through various interfaces.

The sensor module 240 may measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, and blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of, or separately from, the processor 210, and may control the sensor module 240 while the processor 210 is in a sleep state.

The input device 250 may include a touch panel 252, a (digital) pen sensor 254, a key 256, or an ultrasonic input device 258. The touch panel 252 may use at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include a recognition sheet that is a part of, or separate from, the touch panel. The key 256 may include a physical button, an optical key, or a keypad. The ultrasonic input device 258 may detect ultrasonic waves, which are generated by an input tool, through a microphone (e.g., a microphone 288) to identify data corresponding to the detected ultrasonic waves.

The display 260 (e.g., the display 160) may include a panel 262, a hologram device 264 or a projector 266. The panel 262 may have a configuration that is the same as, or similar to, that of the display 160 illustrated in FIG. 1. The panel 262 may be implemented to be flexible, transparent, or wearable. The panel 262, together with the touch panel 252, may be implemented as one module. The hologram device 264 may show a three-dimensional image in the air by using an interference of light. The projector 266 may display an image by projecting light onto a screen. The screen may be located in the interior of, or on the exterior of, the electronic device 201. The display 260 may further include a control circuit for controlling the panel 262, the hologram device 264, or the projector 266.

The interface 270 may include a high-definition multimedia interface (HDMI) 272, a USB 274, an optical interface 276, or a D-subminiature (D-sub) 278. The interface 270 may be included in the communication interface 170 illustrated in FIG. 1. Additionally or alternatively, the interface 270 may include a mobile high-definition link (MHL) interface, an SD card/MMC interface, or an infrared data association (IrDA) standard interface.

The audio module 280 may convert a sound into an electrical signal, and vice versa. At least some elements of the audio module 280 may be included in the input/output interface 150 illustrated in FIG. 1. The audio module 280 may process sound information that is input or output through a speaker 282, a receiver 284, earphones 286, the microphone 288, etc.

The camera module 291 is a device that can photograph a still image and a moving image. The camera module 291 may include one or more image sensors (e.g., a front sensor or a rear sensor), a lens, an image signal processor (ISP), or a flash (e.g., an LED or xenon lamp).

The power management module 295 may manage the power of the electronic device 201. The electronic device 201 may be an electronic device that receives power through a battery, but the electronic device according to the present disclosure is not limited thereto. The power management module 295 may include a power management integrated circuit (PMIC), a charger integrated circuit (IC), or a battery or fuel gauge. The PMIC may have a wired and/or wireless charging method. Examples of the wireless charging method may include a magnetic resonance method, a magnetic induction method, an electromagnetic wave method, etc. Additional circuits (e.g., a coil loop, a resonance circuit, a rectifier, etc.) for wireless charging may be further included. The battery gauge may measure the residual amount of the battery 296 as well as a voltage, current, or temperature while charging. The battery 296 may include a rechargeable battery and/or a solar battery.

The indicator 297 may indicate a particular state (e.g., a booting state, a message state, a charging state, and the like) of the electronic device 201 or a part (for example, the processor 210) thereof. The motor 298 may convert an electrical signal into a mechanical vibration and may generate a vibration, a haptic effect, and the like. Although not illustrated, the electronic device 201 may include a processing unit (e.g., a GPU) for supporting mobile TV. The processing unit for supporting mobile TV may process media data according to a standard, such as digital multimedia broadcasting (DMB), digital video broadcasting (DVB), mediaFlo™, and the like.

Each of the above-described component elements of hardware according to embodiments of the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
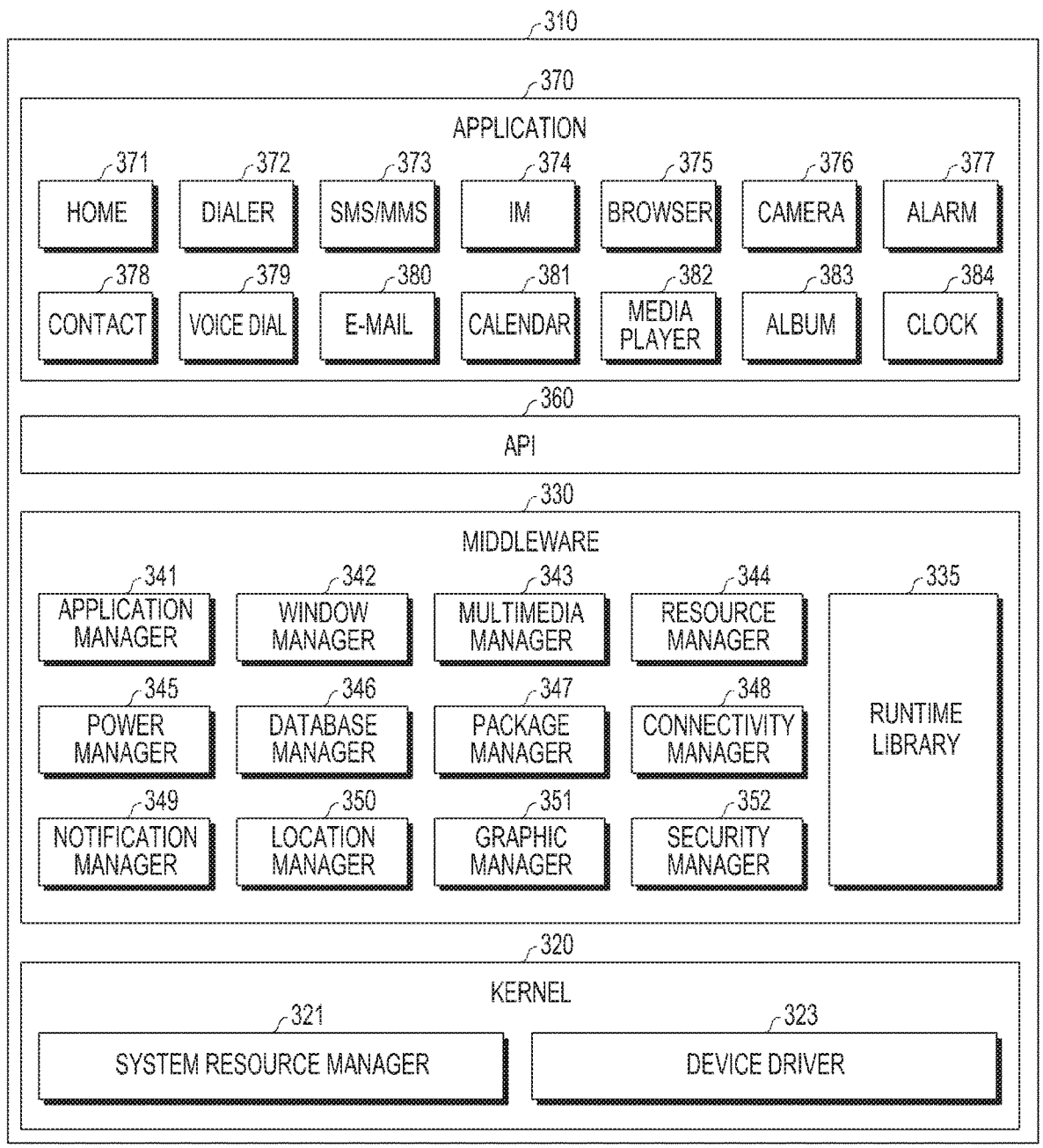
FIG. 3 is a block diagram of a program module according to an embodiment of the present disclosure.

FIG. 3 is a block diagram of a program module according to an embodiment of the present disclosure.

Referring to FIG. 3, the program module 310 (e.g., the program 140) may include an OS that controls resources relating to an electronic device (e.g., the electronic device 101) and/or various applications (e.g., the application programs 147) that are executed in the OS. The OS may be, for example, Android™, iOS™, Windows™, Symbian™, Tizen™, Bada™, and the like.

The program module 310 may include a kernel 320, middleware 330, an API 360, and/or applications 370. At least a part of the program module 310 may be preloaded on the electronic device, or may be downloaded from an external electronic device (e.g., the electronic device 102 or 104 or the server 106).

The kernel 320 (e.g., the kernel 141) may include a system resource manager 321 and/or a device driver 323. The system resource manager 321 may control, allocate, or retrieve system resources. The system resource manager 321 may include a process manager, a memory manager, or a file system manager. The device driver 323 may include a display driver, a camera driver, a BT driver, a shared memory driver, a USB driver, a keypad driver, a Wi-Fi driver, an audio driver, or an inter-process communication (IPC) driver.

The middleware 330 may provide a function required by the applications 370 in common, or may provide various functions to the applications 370 through the API 360 such that the applications 370 can efficiently use limited system resources within the electronic device. The middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, and the like.

The application manager 341 may manage the life cycle of at least one of the applications 370. The window manager 342 may manage graphical user interface (GUI) resources used on a screen. The multimedia manager 343 may determine formats required to reproduce various media files and may encode or decode a media file using a coder/decoder (codec) appropriate for the corresponding format. The resource manager 344 may manage resources, such as the source code, the memory, the storage space, and the like of at least one of the applications 370.

The power manager 345 may operate together with, for example, a basic input/output system (BIOS) to manage a battery or power and provide power information required for the operation of the electronic device. The database manager 346 may generate, search, and/or change a database to be used by at least one of the applications 370. The package manager 347 may manage the installation or update of an application that is distributed in the form of a package file.

The connectivity manager 348 may manage a wireless connection, such as Wi-Fi, BT, and the like. The notification manager 349 may display or notify of an event, such as an arrival message, an appointment, a proximity notification, etc., in such a manner as not to disturb a user. The location manager 350 may manage the location information of the electronic device. The graphic manager 351 may manage a graphic effect to be provided to a user and a user interface relating to the graphic effect. The security manager 352 may provide various security functions required for system security, user authentication, etc. In a case where the electronic device (e.g., the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide specialized modules according to the types of OS in order to provide differentiated functions. Furthermore, the middleware 330 may dynamically remove some of the existing elements, or may add new elements.

The API 360 (e.g., the API 145) is a set of API programming functions, and may be provided with different configurations according to OS. For example, in the case of Android or iOS, one API set may be provided for each platform, and in the case of Tizen, two or more API sets may be provided for each platform.

The applications 370 (e.g., the application programs 147) may include one or more applications that can perform functions, for example, home 371, dialer 372, short message service (SMS)/multi-media message service (MMS) 373, instant message (IM) 374, browser 375, camera 376, alarm 377, contacts 378, voice dial 379, e-mail 380, calendar 381, media player 382, album 383, clock 384, health care (e.g., measuring exercise quantity or blood sugar), and environment information (e.g., atmospheric pressure, humidity, temperature information, and the like).

The applications 370 may include an application ("information exchange application") that supports information exchange between the electronic device (e.g., the electronic device 101) and an external electronic device (e.g., the electronic device 102 or 104). The information exchange application may include a notification relay application for forwarding specific information to the external electronic device or a device management application for managing the external electronic device.

The notification relay application may include a function of transferring, to the external electronic device (e.g., the electronic device 102 or 104), notification information that is generated from the other applications (e.g., the SMS/MMS application, the e-mail application, the health care application, the environmental information application, and the like) of the electronic device. Furthermore, the notification relay application may receive notification information from the external electronic device and may provide the received notification information to a user.

The device management application may manage (e.g., install, delete, or update), at least one function of an external electronic device (e.g., the electronic device 102 or 104) that communicates with the electronic device (e.g., a function of turning on/off the external electronic device itself (or some components thereof) or a function of adjusting the brightness (or resolution) of a display), applications that operate in the external electronic device, or services (e.g., a call service, a message service, and the like) that are provided by the external electronic device.

The applications 370 may include applications (e.g., a health care application of a mobile medical appliance, and the like) that are specified according to attributes of an external electronic device (e.g., the electronic device 102 or 104). The applications 370 may include applications that are received from an external electronic device (e.g., the server 106, or the electronic device 102 or 104). The applications 370 may include preloaded applications or third-party applications that can be downloaded from a server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least a part of the program module 310 may be implemented (e.g., executed) by, for example, a processor (e.g., the processor 210). At least some of the program module 310 may include, for example, a module, a program, a routine, a set of instructions, and/or a process for performing one or more functions.

Figure 4:
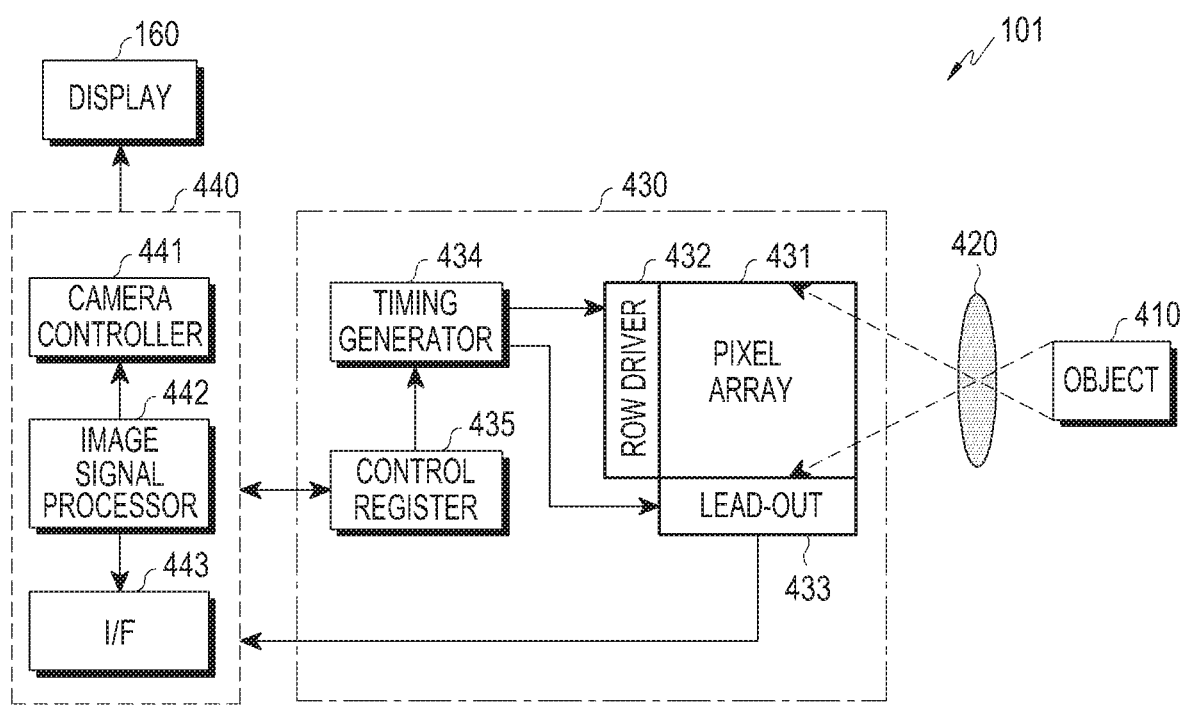
FIG. 4 illustrates an example of an electronic device that outputs image data according to an embodiment of the present disclosure.

FIG. 4 illustrates an example of an electronic device that outputs image data according to an embodiment of the present disclosure.

Referring to FIG. 4, the electronic device 101 may include, for example, a lens 420, an image sensor 430 that detects an object 410 through the lens 420, a controller 440, and the display 160 that outputs an image.

The image sensor 430 may generate image data in accordance with an optical signal. The controller 440 may process the generated image data to display the processed image data on the display 160 that is functionally connected to the electronic device. The controller 440 may identify a mode for generating image data corresponding to the image detected by the image sensor 430 and determine a setting for at least one image attribute (e.g., frame rate and/or resolution) to be used for generating the image at least based on the mode.

The image sensor 430 may be configured in the unit of a plurality of pixels, and each unit pixel may include a plurality of subpixels. The subpixel may include a photodiode. The image sensor 430 may include a structure having two or more subpixels (e.g., photodiodes) in one unit pixel. The image sensor 430 may output color information including at least one of color information among R (red), G (green), and B (blue).

The image sensor 430 may include a pixel array 431 including a plurality of subpixels, a row driver 432 that controls an array of the subpixels in the unit or rows, a lead-out 433 that stores, senses, amplifies, and/or outputs a signal output from the array of the subpixels, a timing generator 434 that provides a clock signal to the row driver 432 and the lead-out 433, and/or a control register 435 that stores various commands required for the operation of the image sensor 430. The controller 440 may include a camera controller 441, an image signal processor 442, and/or an I/F (interface) 443.

The image sensor 430 may detect the object 410 imaged through the lens 420 by a control of the controller 440. The controller 440 may output image data detected and generated by the image sensor 430 on the display 160. The display 160 may be any device that may output image data. For example, the display 160 may be implemented as a dedicated display (such as a monitor or a display formed on the electronic device, such as a computer, a mobile phone, a TV, or a camera). The image sensor 430 may acquire an optical signal corresponding to the object 410. The image sensor 430 may be functionally connected to the controller 440. Although the image sensor 430 is described as an element of the image sensor or the camera, the image sensor 430 is not limited thereto and can be variously modified.

The controller 440 may output information for calculating a phase difference between two or more subpixels. Further, the controller 440 may obtain color information by using information read from the image sensor 430. The controller 440 may identify a setting of image attributes corresponding to the object 410. For example, when the setting of the image attributes meets a predetermined condition (e.g., the setting is within a first predetermined range), the image sensor 430 may output pixel data of an image corresponding to the object 410 by using a first signal corresponding to a first subpixel and a second signal corresponding to a second subpixel. Further, the image sensor 430 may generate image data by using the pixel data. In addition, when the setting of the image attributes does not meet the predetermined condition (e.g., the setting is within another predetermined range (e.g., a second predetermined range) that is different from the first predetermined range), the controller 440 may control (or set) the corresponding pixel to be not used for determining the phase difference based on the first signal corresponding to the first subpixel and the second signal corresponding to the second subpixel.

The controller 440 may adjust information (e.g., information for calculating the phase difference or image data) output through the image sensor 430. For example, the controller 440 may differently adjust the information output through the image sensor 430 based on the setting of the image attributes or the mode (e.g., first mode to fourth mode). The controller 440 may differently adjust the information (e.g., information for calculating the phase difference or image data) output through the image sensor 430 according to each mode. For example, in the first mode, the controller 440 may control the image sensor 430 to output only the information for calculating the phase difference by using a signal of each subpixel level. Further, the controller 440 may identify phase difference information by post-processing the information for calculating the phase difference.

In the second mode, the controller 440 may control the image sensor 430 to output image data generated by combining data of respective subpixel levels (e.g., the first signal and the second signal). For example, the signal acquired through the image sensor 430 may include one unit pixel level signal that is not identified as the first signal or the second signal.

In the third mode, the controller 440 may control the image sensor 430 to output information for calculating a phase difference by using the signal of each subpixel level. Further, the controller 440 may control the image sensor 430 to process and output data of each subpixel level (e.g., the first signal and the second signal) as image data of the unit pixel level (e.g., combine or average the first signal and the second signal).

In the fourth mode, the controller 440 may control the image sensor 430 to output information for calculating the phase difference by using the signal of each subpixel level. Further, the controller 440 may control the image sensor 430 to process and output data of each subpixel level (e.g., the first signal and the second signal) as image data of the unit pixel level (e.g., combine or average the first signal and the second signal). For example, the controller 440 may differently adjust an operation for processing the image data based on attributes (e.g., color) of the unit pixel. When the attributes of the unit pixel correspond to red or blue, the controller 440 may control the image sensor 430 to output image data generated by combining the data of respective subpixel levels (e.g., first signal and second signal). Further, when the attributes of the unit pixel correspond to green, the controller 440 may control the image sensor 430 to process and output the data of the respective subpixel levels (e.g., first signal and second signal) as the image data of the unit pixel level The controller 440 may determine a setting of the image attributes based on a user input as well the setting of the image attributes. For example, when the user input is generated, the controller 440 may identify a mode corresponding to the user input and determine a setting of image attributes related to the mode. When there is a user input received through a camera (e.g., the camera 376) in applications included in the electronic device 101, the controller 440 may identify a determined mode through the user input. Further, the controller 440 may determine a setting of the image attributes based on the mode.

When the setting of the image information meets a predetermined condition (e.g., the setting is within a first predetermined range), the controller 440 may control (or set) the corresponding pixel to generate image data by using the first signal and the second signal.

When the setting of the image information does not meet the predetermined condition (e.g., the setting is within a predetermined range (e.g., second predetermined range) different from the first predetermined range), the controller 440 may control the image sensor 430 to generate the image data by reading a combination of the first signal and the second signal. The image information may include, for example, a size of the object 410, a distance between the object 410 and the image sensor, a movement speed of the object 410, a frame rate of the image to be output through the display 160, or a combination thereof.

When the image information includes the frame rate of the image to be output, the predetermined condition (e.g., first predetermined range) of the setting of the image information may include a low speed frame rate, and the other predetermined range (e.g., second predetermined range) that does not meet the predetermined condition may include a high speed frame rate. The low speed frame rate may include 30 frames per second, and the high speed frame rate may include 60 frames per second. The high speed frame rate and the low speed frame rate, according to various embodiments, may vary depending on the specification or technology development of the electronic device 101.

The camera controller 441 may control the control register 435. The camera controller 441 may control the image sensor 430 or the control register 435 by using, for example, an Inter-Integrated Circuit (I2C). In some embodiments, the controller 440 may omit at least one of the elements or may additionally include another element.

The image signal processor 442 may receive a sub-pixel signal (SPS) corresponding to an output signal of the lead-out 433 and process and/or handle the subpixel signal in the unit of subpixels or pixels, so as to generate image data. The image signal processor 442 may display, for example, the image data on the display 160 through the I/F 443.

The pixel array 431 may include a plurality of unit pixels. Each unit pixel may include a plurality of subpixels. Each unit pixel may include two photodiodes or four photodiodes. Each subpixel may sense light incident through the lens 420 and output at least one subpixel signal according to a control of the row driver 432. The subpixels signal may be a digital signal having a value of "0" or "1". An example of the subpixel will be described in detail with reference to FIGS. 5, and 6A to 6E.

The timing generator 434 may control the operation or timing of the row driver 432 and/or the lead-out 433 by outputting a control signal or a clock signal to each of the row driver 432 and/or the lead-out 433. The control register 435 operates according to a control of the camera controller 441, stores various commands required for the operation of the image sensor 430, and transmits the various commands to the timing generator 434.

The pixel array 431 may output the subpixel signal from a row selected by each control signal provided by the row driver 432 to the lead-out 433.

The lead-out 433 may temporarily store the subpixel signal output from the pixel array 431, and then sense, amplify, and output the subpixel signal. The lead-out 433 may include a plurality of column memories (e.g., SRAM) included in each column to temporarily store the pixel signal, a sense amplifier (SA) (not shown) for sensing and amplifying the pixel signal, or a counter (not shown) for counting the temporarily stored pixel signal.

The lens 420 may include a main lens. For example, the main lens may be implemented in the size corresponding to the whole pixel array 431 and make an image of the object 410 focused.

The controller 440 may identify a mode for outputting image data corresponding to the object detected through the image sensor 430, and determine a setting for at least one image attribute (e.g., frame rate and/or resolution) to be used for generating the image at least based on the identified mode. Further, the image sensor 430 may generate the image data by using pixel data corresponding to an optical signal at least based on the setting. The mode may include a first mode in which signals (or pixel data corresponding to optical signals) of a subpixels level are output from all subpixels included in the image sensor 430, a second mode in which image data of a unit pixel level is output by combining and reading signals of each subpixel level within the unit pixel, a third mode in which signals are acquired from respective subpixels within the unit pixel, information for calculating a phase difference between subpixels is generated through the acquired signals, and image data of a unit pixel level generated by combining or averaging signals acquired from respective subpixels within the unit pixel and the information for calculating the phase different are output, and a fourth mode in which image data of the unit pixel level is output by combining and reading signals of respective subpixels within a first unit pixel (e.g., R pixel or B pixel) at the subpixel level, information for calculating a phase different is output using signals acquired from respective subpixels within a second unit pixel (e.g., G pixel), and image data of the unit pixel level is output by combining or averaging the acquired signals at the subpixel level. In the fourth mode, the image data output by the first unit pixel and the image data and the information output by the second unit pixel may be output together. Further, the controller 440 may control the electronic device 101 to display the image data output by the image sensor 430 on the display 160 through a post-processing process.

The controller 440 may identify a phase difference by using information for calculating the phase difference. For example, based on a signal (e.g., information for calculating the phase difference) acquired in each subpixel, the controller 440 may identify attributes (e.g., brightness information or color information) included in the signal and identify the phase difference based on a difference between the identified attributes (e.g., a difference of the attributes of the subpixels). The controller 440 may identify the phase difference based on a difference between brightness information acquired in the subpixels.

The electronic device 101 (controller 440) may output signals of subpixel levels in all subpixels of the image sensor 430, for example, in the first mode. The image sensor 430 may output the signal of the subpixel level in each of the plurality of subpixels included in each unit pixel.

The electronic device 101 (controller 440) may output image data of a unit pixel level corresponding to a sum of the subpixels according to each unit pixel of the image sensor 430 in order to generate the image in the second mode at a higher speed than that in the first mode. For example, since an amount of data becomes smaller in the second mode compared to the first mode, the electronic device 101 (controller 440) may output the image data at a high speed and may not output the information for calculating the phase difference between subpixels.

The electronic device 101 (controller 440) may acquire a signal in each subpixel within the unit pixel of the image sensor 430, output information for calculating a phase difference between subpixels by using the acquired signal, combine or average the signals of the subpixels according to each unit pixel, read the added up or averaged signals, and output image data of the unit pixel level in the third mode. In the third mode, the information and the image data may be simultaneously output. The information may include filtered data for calculating the phase difference.

The electronic device 101 (controller 440) may combine and read signals acquired from respective subpixels within the first unit pixel at the subpixel level and output image data of the unit pixel level. Further, signals may be acquired from respective subpixels within the second unit pixel, information for calculating a phase difference between subpixels within the second unit pixel may be generated using the acquired signals, and image data of thee unit pixel level may be output by combining or averaging and reading the acquired signals. Further, in the fourth mode, the image data output by the first unit pixel, the image data output by the second unit pixel, and the generated information may be combined and output. The electronic device 101 (controller 440) may combine and output signals of respective subpixels in the corresponding pixel between the R pixel and the B pixel and output each signal of the subpixel level from each subpixel of the G pixel in the fourth mode. In this case, in the fourth mode, information for calculating a phase difference between subpixels and the image data may be simultaneously output. In the fourth mode, for example, information for calculating a phase difference between subpixels of the G pixel may be output.

In the first mode, the electronic device 101 (controller 440) may set image information as AF and set the setting of the image information as high speed AF (for example, AF using phase difference information). In the first mode, the controller 440 may output image data, for example, at a low frame rate (for example, 30 frames per second). In the first mode, the controller 440 may output a signal of a subpixel level in each unit pixel.

In the second mode, the electronic device 101 (controller 440) may set image information as a frame rate and set the setting of the image information as a high frame rate. In the second mode, the controller 440 may output the image data, for example, a high frame rate (for example, 60 frames per second) and may not generate information for calculating a phase difference between subpixels. The controller 440 may output only image data of the unit pixel level by combining signals of respective subpixels within each unit pixel for a high speed operation.

In the third mode, the electronic device 101 (controller 440) may set image information as AF and frame rate, and may set the setting of AF as high speed AF (for example, AF using phase difference information) and the setting of frame rate as high frame rate. In the third mode, the controller 440 may acquire signals in respective subpixels within the unit pixel, generate information for calculating a phase difference by using the acquired signals, and combine or average the signals acquired in the respective subpixels within the unit pixel at the subpixel levels, so as to output image data of the unit pixel level. In the third mode, the information and the data, which has been added up or averaged, may be output at the same time.

In the fourth mode, the electronic device 101 (controller 440) may set image information as AF and frame rate, and set the setting of AF as high speed AF (e.g., AF using phase difference information) and the setting of frame rate as high frame rate. In the fourth mode, the controller 440 may output image data at a higher frame rate (for example, 60 frames per second) compared to the first mode. Further, the controller 440 may output image data by using power that is lower than power used to output the image data in the third mode. The controller 440 may output image data of the unit pixel level by combining signals acquired in respective subpixels within a first unit pixel (e.g., R pixel and B pixel) at the subpixel level. The controller 440 may output information for calculating a phase difference by using signals acquired in respective subpixels within a second unit pixel (e.g., G pixel) and output image data of the unit pixel level by combining or averaging the acquired signals at the subpixel level. The controller 440 may output the image data output by the first unit pixel and the image data output by the second unit pixel and the information for calculating the phase difference in the fourth mode. The information for calculating the phase difference between subpixels may be added to the generated image data. Further, the generated image data may be output along with the information. The first unit pixel may include the R pixel and the B pixel, and the second unit pixel may include the G pixel. The controller 440 may combine the signals acquired in subpixels included in the pixel corresponding to the R pixel or the B pixel and combine or average the signals acquired in subpixels included in the G pixel, so as to output image data of the unit pixel level. Further, the controller 440 may generate the information for calculating the phase difference by using the signals of the subpixels included in the G pixel.

The controller 440 may process the image data output from the R pixel, the image data output from the B pixel, and the image data output from the G pixel according to each mode and display the image on the display 160. The controller 40 may process, in the unit of subpixels or unit pixels, the signals of the subpixel level output from the lead-out 433 or the image data in the unit of unit pixels to generate the image and display the generated image on the display 160.

Although it is illustrated that all the elements are included in the electronic device 101, various embodiments are not limited thereto. For example, according to the role, function, or capability of the electronic device 101, at least some of the elements of the electronic device 101 may be distributed to the electronic device 101 and an external electronic device (for example, the first external electronic device 102, the second external electronic device 104, or the server 106).

According to various embodiments of the present disclosure, although the controller 440 is illustrated as an element separated from the image sensor 430, various embodiments are not limited thereto. For example, the controller 440 may be included in at least a part of the image sensor 430 according to a role, function, or capability of the electronic device 101. For example, the camera controller 441 or the interface unit (I/F) 443 may be included in the image sensor 430, and the image signal processor 442 may be implemented to be separated from the image sensor 430.

According to various embodiments of the present disclosure, at least some of the camera controller 441, the image signal processor 442, or the interface unit (I/F) 443 may be implemented in software, firmware, hardware, or a combination of two or more thereof. At least some of the camera controller 441, the signal processor 442, or the interface unit (I/F) 443 may be implemented (for example, executed) by, for example, a processor (for example, the processor 120). At least some of the camera controller 441, the image signal processor 442, and the interface unit (I/F) 443 may include, for example, a module, a program, a routine, sets of instructions, or a process for performing one or more functions.

According to various embodiments of the present disclosure, the electronic device 101 may implement, for example, the camera controller 441, the image signal processor 442, or the I/F 443 to be integrated with the processor (for example, the processor 120 of FIG. 1), and the camera controller 441, the image signal processor 442, or the I/F 443 may be stored, in a software form, in a (dedicated) memory area accessible by the processor and implemented to be executable by the processor.

Figure 5:
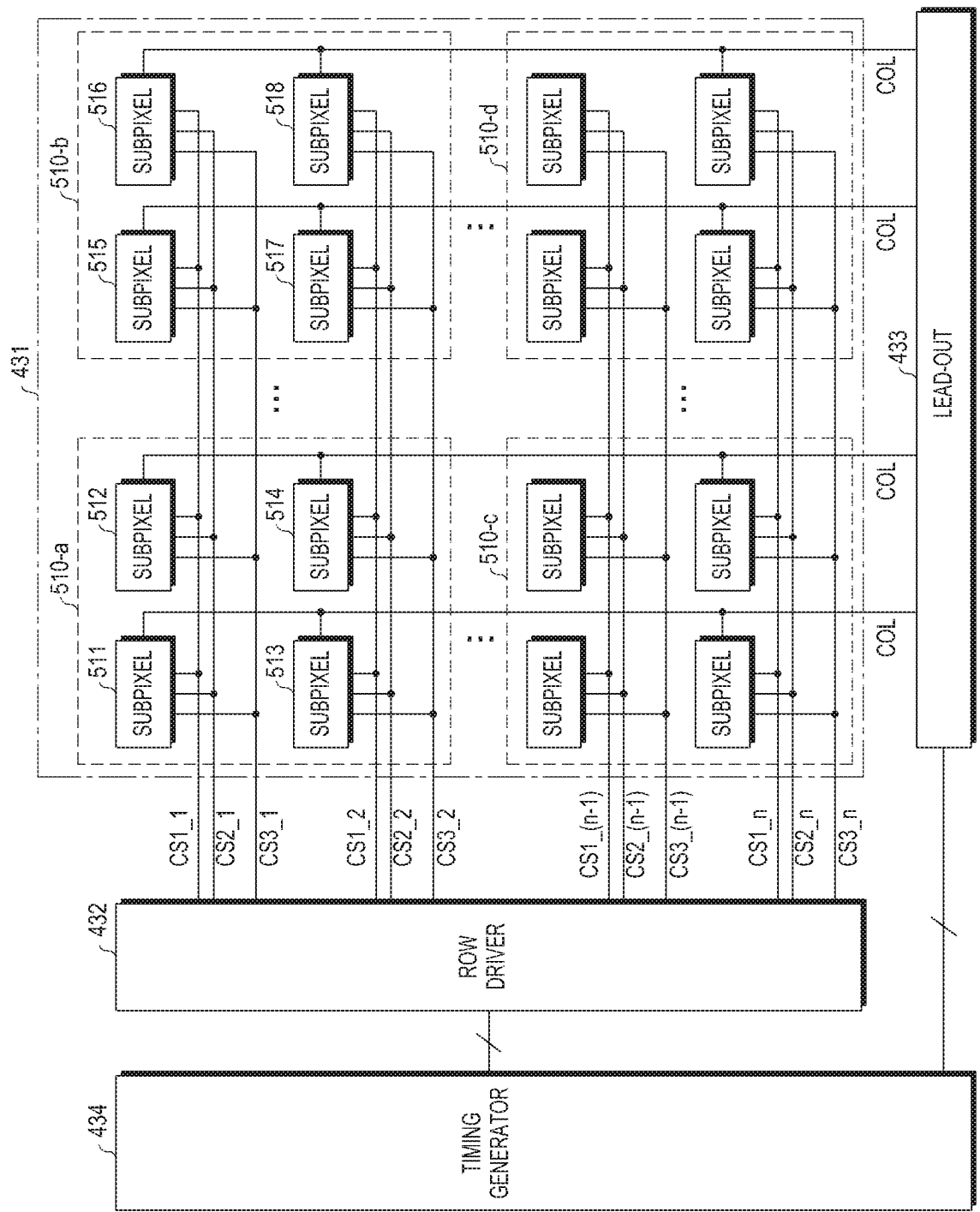
FIG. 5 illustrates an example of a configuration of a pixel array of an image sensor according to an embodiment of the present disclosure.

FIG. 5 illustrates an example illustrating a configuration of a pixel array of the image sensor according to an embodiment of the present disclosure.

Referring to FIG. 5, the pixel array 431 of the image sensor 430 may include, for example, a plurality of unit pixels 510-*a* to 510-*d* arranged in a matrix type, and each unit pixel may include a plurality of subpixels. The image sensor 430 may output signals corresponding to the product of all unit pixels and subpixels of each unit pixel at once or output signals corresponding to the number of all unit pixels by combining signals of the subpixel level of one unit pixel. The first unit pixel 510-*a* may include a plurality of subpixels 511, 512, 513, and 514. The second unit pixel 510-*b* may include a plurality of subpixels 515, 516, 517, and 518. Alternatively, the unit pixel may include two subpixels (or photodiodes) or four subpixels (or photodiodes). A subpixel pitch may be smaller than a pixel pitch in the general image sensor 430.

Although FIG. 5 illustrates that each of the first unit pixel 510-*a* to the fourth unit pixel 510-*d* includes four subpixels, the present disclosure is not limited thereto.

The pixel array 431 may output signals of respective subpixel levels according to a column line in the unit of rows based on a control of the timing generator 434.

A filter array (not shown) including each color filter for penetrating or blocking light of a particular spectrum area may be arranged on an upper part of the unit pixels included in the pixel array 431. Further, a micro lens for increasing, for example, light gathering power may be arranged on an upper part of a plurality of unit pixels included in the pixel array 431.

The row driver 432 may drive a plurality of control signals for controlling the operation of each of a plurality of subpixels 420 into the pixel array 431 according to a control of the timing generator 434. For example, the plurality of control signals may include a signal for controlling transmission of optical charge generated by each of the plurality of subpixels, a signal for selecting each of the plurality of subpixels, or a signal for resetting each of the plurality of subpixels. The lead-out block 433 may include various elements (for example, a counter, a memory, a lead-out circuit, or a sense amp circuit) for processing signals of the subpixel level output from the pixel array 431.

The image signal processor 442 may process and/or handle the signals of the subpixel level output from the first unit pixel 510-*a* to the fourth unit pixel 510-*d*. For example, the image signal processor 442 may combine, for example, the signals of the subpixel level and added signals as one unit pixel level image data.

The lead-out 433 may output the signal of the subpixel level corresponding to the subpixel of each of the first unit pixel 510-*a* to the fourth unit pixel 510-*d*. The first unit pixel 510-*a* to the fourth unit pixel 510-*d* may output, for example, signals of the subpixel level corresponding to a plurality of subpixels having passed through the corresponding micro lens. The image signal processor 442 may process and/or handle, for example, the signals of the subpixel level and generate angular information and depth data.

Figure 6A:
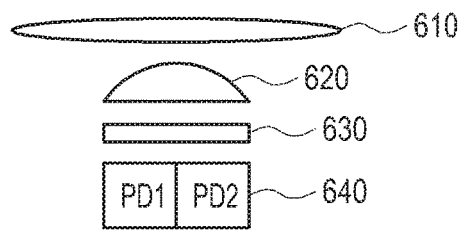
FIG. 6A schematically illustrates a unit pixel having two photodiodes in an image sensor according to an embodiment of the present disclosure.

FIG. 6A schematically illustrates a unit pixel having two photodiodes in the image sensor according to an embodiment of the present disclosure.

Figure 6B:
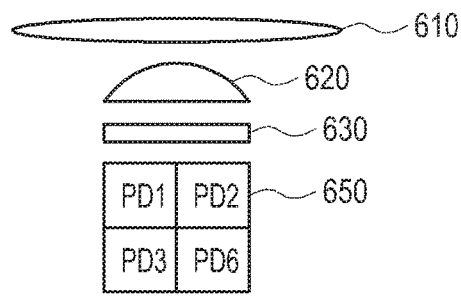
FIG. 6B schematically illustrates a unit pixel having four photodiodes in an image sensor according to an embodiment of the present disclosure.

FIG. 6B schematically illustrates a unit pixel having four photodiodes in the image sensor according to an embodiment of the present disclosure.

Figure 6C:
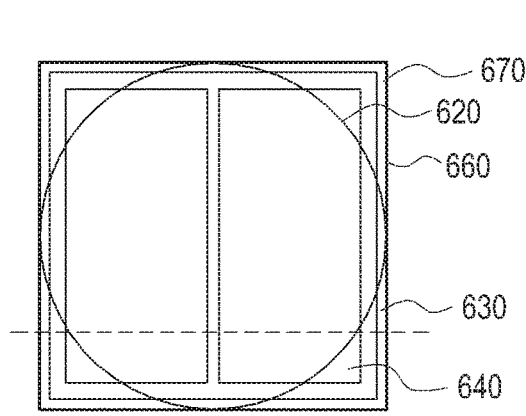
FIG. 6C illustrates a structure of a unit pixel having two photodiodes according to an embodiment of the present disclosure.

FIG. 6C illustrates an example of a structure of the unit pixel having two photodiodes according to an embodiment of the present disclosure.

Figure 6D:
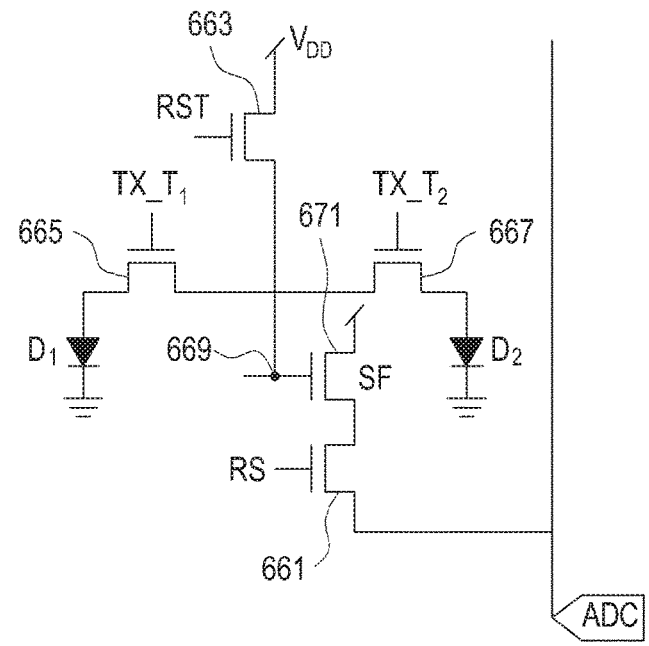
FIG. 6D is a circuit diagram of a unit pixel having two photodiodes in an image sensor according to an embodiment of the present disclosure.

FIG. 6D is a circuit diagram illustrating the unit pixel having two photodiodes in the image sensor according to an embodiment of the present disclosure.

Figure 6E:
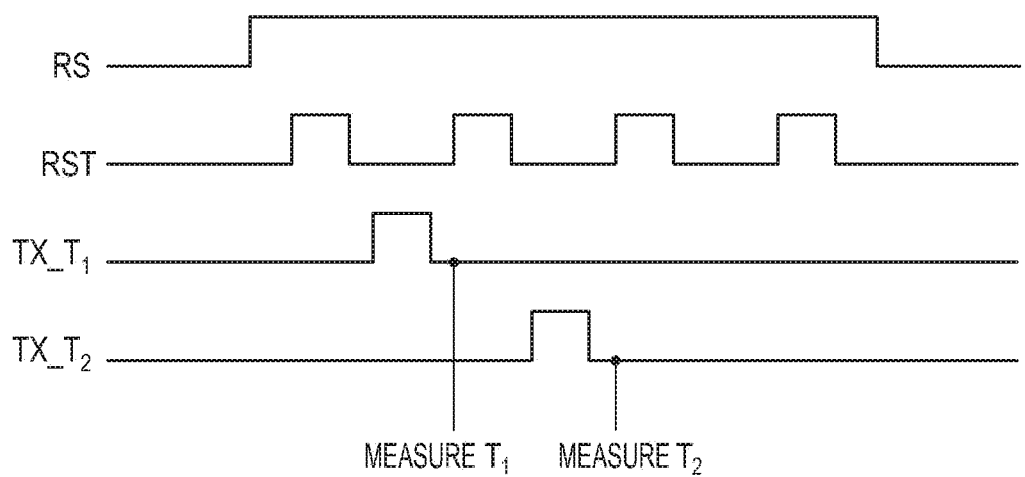
FIG. 6E illustrates an example of a time chart of each switch in a unit pixel according to an embodiment of the present disclosure.

FIG. 6E illustrates an example of a time chart of each of the switches in the unit pixel according to an embodiment of the present disclosure.

Referring to FIGS. 6A to 6E, when light enters an optical conductor through a color filter, electron-positive hole generated in the optical conductor is changed according to a wavelength and strength of the light, and the image sensor 430 according to an embodiment of the present disclosure may output a voltage signal of a level at which the signal can be processed. The image sensor 430 may be divided into, for example, a charge coupled device (CCD) type image sensor and a complementary metal oxide semiconductor (CMOS) type image sensor according to a type thereof. The image sensor 430 may configure a plurality of unit pixels, and may use an image sensor array, in which a plurality of unit pixels is arranged in predetermined columns and rows, in order to acquire a predetermined size of image data.

The unit pixel of the image sensor 430 may include two photodiodes 640, a color filter 630, and/or a micro lens 620. Further, the unit pixel of the image sensor 430 may include four photodiodes 650, the color filter 630, and/or the micro lens 620. The image sensor 430, according to an embodiment of the present disclosure, may include an array of unit pixels consisting of a plurality of subpixels as illustrated in FIGS. 6A and 6B. The number of subpixels per unit pixel may be predetermined, and FIG. 6A illustrates two subpixels and FIG. 6B illustrates four subpixels.

The controller 440 may combine signals of respective subpixel levels of the unit pixel and output one image data. Further, the controller 440 may output information for calculating a phase difference between subpixels (e.g., photodiodes) include in each unit pixel. For example, as illustrated in FIG. 6A, the unit pixel according to an embodiment of the present disclosure may also output information for calculating a phase difference of light incident to each photodiode and output color information corresponding to a combination of signals of two subpixel levels (e.g., photodiodes).

The image sensor may output a value of each photodiode and, accordingly, one unit pixel may output each piece of color information of a plurality of photodiodes. For example, when the image sensor having pixels of HD (1280×720) includes a 4PD structure having four photodiodes in one unit pixel, the image sensor may read a color value of each photodiode and output image data having resolution of quad high definition (QHD) (2560×1440).

The photodiodes 640 and 650 may convert incident light into an electric signal, generate the converted electric signal, and include accumulated doping areas. Further, the doping areas may be accumulated based on an incidence angle of the incident light.

The lens 610 may be functionally connected to an actuator for optical image stabilization (OIS) or auto focus (AF).

The color filter 630 may be an R (red) filter, a G (green) filter, a B (blue) filter, a yellow filter, a magenta filter, or a cyan filter.

The color filter 630 may be formed on the photodiodes 640 and 650 based on the incidence angle of the incident light and have a Bayer pattern. In the Bayer pattern, filters that receive brightness of each of red, green, and blue on a two-dimensional plane in order to make image data including dots by gathering brightness and colors of a target. Each unit pixel forming a grid network below the Bayer pattern color filter may recognize only a color allocated among red, green, and/or blue instead of recognizing full color, and may interpolate the color so as to infer the full color.

The micro lens 620 may be formed to correspond to the photodiodes 640 and 650 on the color filter 630 while maintaining an angle of inclination at which the color filter 630 is accumulated. Further, the OIS lens 610 may be located inside, a lens mount (not shown) and may gather light.

Referring to FIG. 6C, according to an embodiment of the present disclosure, the image sensor 430 may include a plurality of unit pixels, each unit pixel 660 may include two or more photodiodes, and a barrier 670 may be located between the photodiodes. Further, at least one color filter 630 may be located on the plurality of photodiodes. In addition, at least one micro lens 620 may be located on the plurality of photodiodes. The micro lens 620 may be located on the color filter 630. Light incident to each unit pixel may be incident to each of different photodiodes via at least one micro lens and at least one color filter, and may output information for focus detection according to a phase difference of the light incident to each photodiode.

Each unit pixel of the image sensor may include a photodiode (PD) for detecting an amount of light, Transmission Switches TX_T1 and TX_T2 for transmitting a charge generated by photodiodes D1 and D2 through floating diffusion, a selection switch RS for selecting a corresponding pixel among at least two pixels included in the image sensor, a reset switch RST for resetting a floating diffusion area, and an amplification switch SF for outputting a potential of the floating diffusion area with an output voltage of the corresponding transmission switch.

Referring to FIGS. 6D and 6E, the two photodiodes D1 and D2 may be electrically connected to, for example, the transmission switches TX_T1 and TX_T2 665 and 667 for transmitting their own signals, respectively.

The photodiodes D1 and D2 may receive light having passed through the same micro lens. For example, each of the two photodiodes may receive light having passed through a color filter area and may generate a charge corresponding to received light energy.

The charge generated in the photodiodes D1 and D2 through the transmission switches 665 and 667 may be transmitted to a floating diffusion area 669. The selection switch RS 661 may select a corresponding pixel from at least two pixels included in the image sensor. The reset switch RST 663 may reset the floating diffusion area 669. When one of the transmission switches 665 and 667 transmits the charge to the floating diffusion area 669 after the reset switch 663 is reset, the amplification switch SF 671 may output the potential of the floating diffusion area 669 with the output voltage of the corresponding transmission switches 665 and 667.

When a color filter area of an optical filter is accumulated in the photodiodes D1 and D2, the output voltage of the photodiodes D1 and D2 may be components of color information output from the image sensor. For example, the output voltage of the photodiodes D1 may be a T1 signal of FIG. 6E, and the output voltage of the photodiodes D2 may be a T2 signal of FIG. 6E.

A time chart of each of the switches 663, 665, and 671 will be described. The selection switch 661 may be at a high level (hereinafter referred to as an "active state") for a predetermined time according to the selection of the corresponding pixel. The reset switch 663 may reset the floating diffusion area 669 by periodically generating a pulse having a high level for a predetermined time according to the active state of the selection switch 661.

As the transmission switches 665 and 667 sequentially generate pulses (hereinafter referred to as a "transmission pulses") having a high level for a predetermined time in a predetermined order according to the generation of the reset pulse by the selection switch 661, the charges generated in the photodiodes D1 and D2 may be sequentially transmitted to the floating diffusion area 669. Further, one of the transmission switches 665 and 667 may transmit the charge to the floating diffusion area 669 and the amplification switch 671 may output the potential of the floating diffusion area 669 with the output voltage of the corresponding transmission switch.

The electronic device 101 according to an embodiment of the present disclosure may include an image sensor for acquiring an optical signal corresponding to an object 410, a controller for identifying a mode for generating an image corresponding to the object 410 by using the optical signal, determining a setting of at least one image attribute to be used for generating the image at least based on the mode, generating image data by using pixel data corresponding to the optical signal at least based on the setting, and displaying the image corresponding to the object 410 through a display functionally connected to the electronic device at least based on the image data, and a display for displaying the image data.

According to various embodiments of the present disclosure, the controller 440 determines a first setting of the at least one image attribute as the setting when the mode corresponds to a first mode, determines a second setting of the at least one image attribute as the setting when the mode corresponds to a second mode, determines a third setting of the at least one image attribute as the setting when the mode corresponds to a third mode, and determines a fourth setting of the at least one image attribute as the setting when the mode corresponds to a fourth mode.

According to various embodiments of the present disclosure, the controller may identify a first mode in which a plurality of subpixels included in at least one of a plurality of unit pixels of the image sensor functionally connected to the electronic device output pixel data of a subpixel level, respectively, a second mode in which image data of a unit pixel level is output through a combination of the pixel data of the plurality of subpixels within the unit pixel, a third mode in which signals are acquired from respective subpixels within the unit pixel, information for calculating a phase difference between the subpixels within the unit pixel is output, and image data of the unit pixel level is output by combining or averaging the acquired signals at the subpixel level, and a fourth mode in which image data of the unit pixel level is output by combining signals of respective subpixels within a first unit pixel (e.g., R pixel or B pixel), information for calculating a phase difference using signals acquired from respective subpixels within a second unit pixel (e.g., G pixel) is generated, and image data of the unit pixel level is output by combining or averaging the acquired signals at the subpixel level. Further, in the fourth mode, image data output by a first unit pixel, image data output by a second unit pixel, and information for calculating the phase difference may be output together.

According to various embodiments of the present disclosure, in the first mode, the setting of the image attribute is a low frame rate, and the controller may output information (e.g., information for calculating a phase difference) corresponding to a phase difference between the plurality of subpixels and image data based on the first mode.

According to various embodiments of the present disclosure, in the second mode, the setting of the image attribute is a high frame rate, and the controller may output image data and may not output information (for example, information for calculating a phase difference) corresponding to a phase difference between the plurality of subpixels and based on the second mode. In the third mode, the setting of the image attribute is a higher frame rate than that of the first mode, and the controller may output image data and information (for example, information for calculating a phase difference) corresponding to a phase difference between the plurality of subpixels and based on the third mode.

According to various embodiments of the present disclosure, in the fourth mode, the setting of the image attribute is a high frame rate, and the controller may output image data generated by combining signals of subpixels within a first unit pixel, information generated for calculating a phase difference between pixels by using signals acquired in subpixels within a second unit pixel, and image data generated by combining or averaging the acquired signals.

According to various embodiments of the present disclosure, the controller may generate the image data by combining signals of respective subpixels included in the red (R) pixel and blue (B) pixel among the plurality of unit pixels, information for calculating a phase difference using signals of subpixels included in the green (G) pixel, and image data generated by combining or averaging the acquire signals. The controller may output the generated image and the information for calculating the phase difference.

According to various embodiments of the present disclosure, the image sensor may include a plurality of unit pixels, and each unit pixel may include a pixel array including a plurality of subpixels, a row driver for controlling the array of the subpixels in the unit of rows, a lead-out for storing, sensing, amplifying, or outputting signals output from the array of the subpixels, a time generator for providing clock signals to the row driver and the lead-out, and a control register for storing commands related to the operation of the image sensor.

The electronic device 101 according to an embodiment of the present disclosure may include the display, the image sensor 430 for acquiring an optical signal corresponding to the object 410, and the controller. The controller may identify a mode for generating an image corresponding to the object by using the optical signal, determine a setting of at least one image attribute to be used for generating the image at least based on the mode, generate image data by using pixel data corresponding to the optical signal at least based on the setting, and display the image corresponding to the object through a display functionally connected to the electronic device at least based on the image data.

According to various embodiments of the present disclosure, the controller 440 may determine a first setting of the at least one image attribute as the setting when the mode corresponds to a first mode, and may determine a second setting of the at least one image attribute as the setting when the mode corresponds to a second mode.

According to various embodiments of the present disclosure, the mode may include a first mode in which a plurality of subpixels included in at least one of a plurality of unit pixels of the image sensor output pixel data of a subpixel level, respectively, a second mode in which image data of a unit pixel level is output through a combination of the pixel data of the plurality of subpixels within the unit pixel, a third mode in which information for calculating a phase difference between the plurality of subpixels is generated and image data of the unit pixel level is output by combining or averaging signals of a level of the plurality of subpixels, and a fourth mode in which information for calculating a phase difference between the plurality of subpixels is generated and image data of the unit pixel level is output by selectively combining or averaging pixel data of the plurality of subpixels.

According to various embodiments of the present disclosure, the controller 440 may output information corresponding to the phase difference between the plurality of subpixels when the mode corresponds to the first mode, and may not output the information corresponding to the phase difference between the plurality of subpixels when the mode corresponds to the second mode.

According to various embodiments of the present disclosure, the controller 440 may output image data and information corresponding to the phase difference between the plurality of subpixels when the mode corresponds to the third mode.

According to various embodiments of the present disclosure, the controller 440 may output image data generated by combining pixel data of subpixels within a first unit pixel, information for calculating a phase difference between pixels using pixel data acquired from subpixels within a second unit pixel, and image data generated by combining the acquired pixel data when the mode corresponds to the fourth mode.

The electronic device 101 according to an embodiment of the present disclosure may include an image sensor that acquires an optical signal corresponding to an object, the image sensor including a plurality of unit pixels, at least one of the plurality of unit pixels including a first subpixel and a second pixel, and a controller functionally connected to the image sensor. The controller may acquire pixel data corresponding to the object at least based on optical signal by using the image sensor, identifies a setting of at least one image attribute to be used for generating an image corresponding to the object, determine a phase difference of the image by using a first signal corresponding to the first subpixel and a second signal corresponding to the second subpixel when the setting meets predetermined conditions, and refrain from determining the phase difference when the setting does not meet the predetermined conditions.

According to various embodiments of the present disclosure, the controller 440 may generate the image of a subpixel level by using the first signal and the second signal when the setting meets the predetermined conditions.

According to various embodiments of the present disclosure, the controller 440 may generate the image of a unit pixel level by combining the first signal and the second signal when the setting does not meet the predetermined conditions.

According to various embodiments of the present disclosure, a case where the setting does not meet the predetermined conditions may include a case where the setting meets another predetermined condition.

According to various embodiments of the present disclosure, the at least one image attribute may include a frame rate, and a case where the setting meets the predetermined conditions includes a case where the setting of the at least one image attribute corresponds to a low frame rate and a case where the setting does not meet the predetermined conditions includes a case where the setting of the at least one image attribute corresponds to a high frame rate.

According to various embodiments of the present disclosure, the at least one image attribute may include a size of the object, a distance between the object and the image sensor, a movement speed of the object, or a combination thereof.

According to various embodiments of the present disclosure, a photodiode corresponding to each of the first subpixel and the second subpixel may be included.

According to various embodiments of the present disclosure, when the object size corresponds to a predetermined range through an image data analysis (for example, when the object size is equal to or below 30% of the whole image area), the controller 440 may determine a phase difference of the image corresponding to the object by using a first signal corresponding to the first subpixel and a second signal corresponding to the second subpixel. Alternatively, when the object size does not correspond to the predetermined range (e.g., when the object size is above or equal to 30%% of the whole image area), the controller 440 may not determine the phase difference of the image corresponding to the object by using a first signal corresponding to the first subpixel and a second signal corresponding to the second subpixel. According to an embodiment of the present disclosure, although it has been described that the predetermined range is equal to or below 30%, this is only an embodiment and the predetermined range may be above 30% and may be variable.

According to various embodiments of the present disclosure, the controller 440 may calculate a distance between the object and the image sensor by using at least one of the proximity sensor 240G, the illumination sensor 240K, and an infrared sensor (not shown). The controller 440 may determine whether to generate information for calculating the phase difference based on the distance between the object and the image sensor. When the distance between the object and the image sensor corresponds to a predetermined distance (e.g., shorter than 5 meters), the controller 440 may determine the phase difference of the image corresponding to the object by using a first signal corresponding to a first subpixel and a second signal corresponding to a second subpixel. Alternatively, when the distance between the object and the image sensor does not correspond to the predetermined distance (for example, not shorter than 5 meters), the controller 440 may not determine the phase difference of the image corresponding to the object by using the first signal corresponding to the first subpixel and the second signal corresponding to the second subpixel.

According to various embodiments of the present disclosure, the controller 440 may analyze a movement speed of the object through an image data analysis. For example, when the movement speed of the object determined through the controller 440 corresponds to a predetermined speed (for example, faster than or equal to 4 km/h), the controller 440 may determine the phase difference of the image corresponding to the object by using the first signal corresponding to the first subpixel and the second signal corresponding to the second subpixel. Alternatively, when the movement speed of the object does not correspond to the predetermined speed (for example, not faster than or equal to 4 km/h), the controller 440 may not determine the phase difference of the image corresponding to the object by using the first signal corresponding to the first subpixel and the second signal corresponding to the second subpixel.

Figure 7:
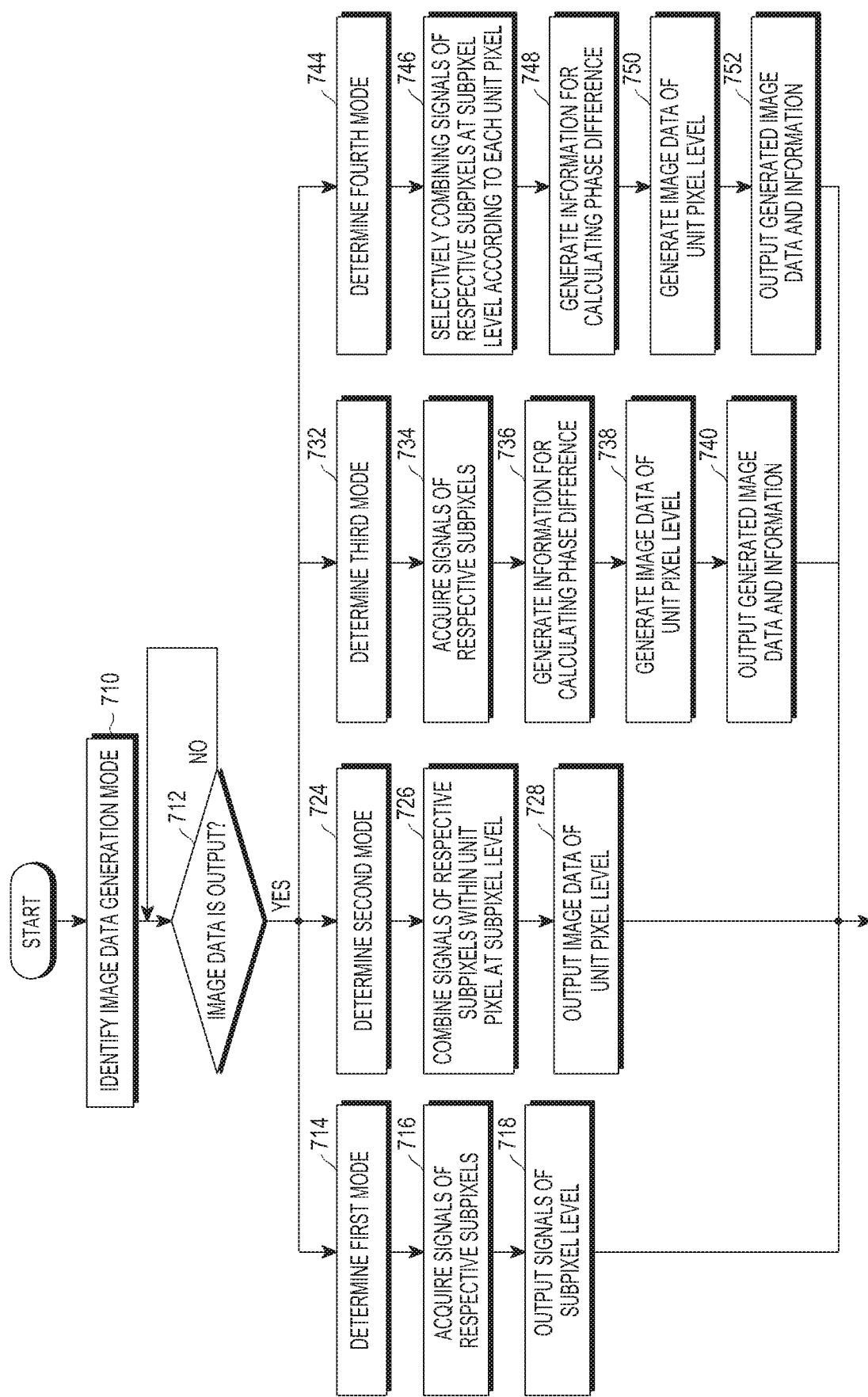
FIG. 7 is a flowchart illustrating an operation for generating image data according to an embodiment of the present disclosure.

FIG. 7 is a flowchart illustrating an operation for generating image data according to an embodiment of the present disclosure.

Referring to FIG. 7, the electronic device 101 (e.g., the controller 440) may identify a mode for generating image data in operation 710. The mode may be selected or determined by the user of the electronic device. For example, the mode may be identified based on a user input acquired through an application (e.g., camera 376) included in the electronic device 101. Further, the electronic device 101 (e.g., controller 440) may determine at least one image attribute to be used for generating image data and a setting of the image attribute in accordance with, for example, the mode (e.g., photographing conditions) selected by the user. For example, the electronic device 101 (e.g., controller 440) may determine a setting of at least one image attribute to be used for generating image data in accordance with photographing conditions (for example, sports, a person having many movements (e.g., child), a person having little movements (e.g., selfie), landscape, continuous shooting, or video) through the camera application (e.g., camera 376). Further, the electronic device 101 (e.g., controller 440) may generate image data according to the determined setting. Among the photographing conditions, the sports may be called a first mode (third mode or fourth mode), the person having little movements (selfie) may be called a second mode, and the person having many movements (child) may be called a third mode or a fourth mode.

When the electronic device 101 (for example, controller 440) is in a preset mode (e.g., default mode or sports), the electronic device 101 may operate in the first mode. In the first mode, the controller 440 may output, for example, signals of subpixel levels in all subpixels. The electronic device 101 (for example, controller 440) may output, for example, signal of respective subpixel levels included in each unit pixels.

When photographing conditions (for example, a person having little movements (selfie), continuous shooting, or video) are selected, the electronic device 101 (e.g., controller 440) may operate in the second mode. In the second mode, the controller 440 may combine and read the signals of the respective subpixel levels within each unit pixel in the subpixels, and then output only image data of the unit pixel level. In this case, since the second mode has a number of pieces of data that is smaller than that in the first mode, image data may be output at a higher speed compared to the first mode.

When the user selects photographing conditions (e.g., sports or child having many movements) that require high speed image processing and phase difference information, the electronic device 101 (e.g., controller 440) may operate in the third mode. In the third mode, the image sensor 430 may acquire signals in respective subpixels, generate information for calculating a phase difference between the subpixels by using the acquired signals, and combine or average the signals acquired in the respective subpixels at the subpixel levels, so as to output image data of the unit pixel level. Further, the electronic device 101 may output the information for calculating the phase difference and the image data.

When the user selects photographing conditions (e.g., sports, video, or child having many movements) that require high speed image processing and some of the pieces of phase difference information, the electronic device 101 may operate in the fourth mode. In the fourth mode, the controller 440 may combine the signals acquired in the respective subpixels within a first unit pixel at subpixel levels and output image data of the unit pixel level. The electronic device 101 may acquire signals in respective subpixels within a second unit pixel, generate information for calculating a phase difference between the subpixels within the second unit pixel by using the acquired signals, and combine or average the acquired signals, so as to output image data of the unit pixel level. In the fourth mode, the image data output by the first unit pixel, the image data output by the second unit pixel, and the information for calculating the phase difference may be output. The first unit pixel may be at least one of an R pixel and a B pixel, and the second unit pixel may be a G pixel.

The electronic device 101 may control the operation of the image sensor 430 in order to output image data in the identified mode. The mode may include a first mode in which signals of the subpixel level are output from all subpixels included in the image sensor, a second mode in which image data of the unit pixel level is output by combining signals of respective subpixels within the unit pixel, a third mode in which signals of the pixel level are acquired from respective subpixels within the unit pixel, information for calculating a phase difference between subpixels is generated through the acquired signals, and image data of the unit pixel level is output by combining or averaging signals of the subpixel level acquired from the respective subpixels within the unit pixel at the subpixel level, and a fourth mode in which image data of the unit pixel level is output by combining signals of respective subpixels within a first unit pixel (e.g., R pixel or B pixel) at the subpixel level, information for calculating a phase difference using signals acquired from respective subpixels within a second unit pixel (e.g., G pixel) is output, and image data of the unit pixel level is output by combining or averaging the acquired signals at the sub pixel level.

In operation 712, the electronic device 101 may identify whether image data is generated. The electronic device 101 may identify whether an optical signal corresponding to an object is received through the image sensor 430. The electronic device 101 may identify a mode for generating image data through the received optical signal corresponding to the object through the image sensor 430.

In operation 714, when the mode is determined as the first mode, the electronic device 101 may acquire signals (or pixel data) from respective subpixels in operation 716. When the image data is output in the first mode, the electronic device 101 may control the image sensor to output image data in the first mode. The electronic device 101 may detect signals output by respective subpixels among a plurality of subpixels included in the unit pixel of the pixel array 431 of the image sensor 430. The electronic device 101 may process signals output in respective sub pixels included in the same unit pixel.

In operation 718, the electronic device 101 may output signals of respective subpixel levels within each unit pixel. The electronic device 101 may output signals of respective subpixel levels in each unit pixel of the pixel array 431.

When the mode is determined as the second mode in operation 724, the electronic device 101 may combine and read signals of respective subpixels within the unit pixel at subpixel levels in operation 726. In operation 728, the electronic device 101 may output only image data of the unit pixel level through the added signal at the sub pixel levels. The electronic device 101 may control the image sensor to output image data in the second mode. The electronic device 101 may combine and read signals of subpixels within the unit pixel of the pixel array 431 of the image sensor 430 at subpixel level and output image data of the unit pixel level.

The electronic device 101 may output image data at a high frame rate (e.g., 60 frames per second) in the second mode, and may not generate or output information for calculating a phase difference between pixels with respect to the image data output by the second mode. The second mode may be applied to a scenario (e.g., continuous shooting) in which only image data is acquired at a high speed. In the second mode, summing of the subpixels may include pixel levels (e.g., analog domain), so that noise may be small.

When the mode is determined as the third mode in operation 732, the electronic device 101 may acquire signals from respective subpixels in operation 734. Further, the electronic device 101 may control the image sensor 430 to output image data in the third mode. In operation 736, the electronic device 101 may generate, for example, information for calculating a phase difference between subpixels included in the unit pixel of the pixel array 431 of the image sensor 430.

In operation 738, the electronic device 101 may generate, for example, image data of the unit pixel level through the signals acquired in the subpixels within the unit pixel. The electronic device 101 may control the image sensor 430 to output image data in the third mode. The electronic device 101 may generate image data at a high frame rate (e.g., 60 frames per second) in the third mode that is faster than the first mode.

In operation 740, the electronic device 101 may output the generated image data and information for calculating a phase difference between subpixels within the unit pixel.

The electronic device 101 may output the generated image data and the information for calculating the phase difference together.

When the mode is determined as the fourth mode in operation 744, the electronic device 101 may selectively combine the signals of respective subpixels according to each unit pixel in operation 746. When the image data is output in the fourth mode, the electronic device 101 may control the image sensor 430 to output image data in the fourth mode. In the fourth mode, the electronic device 101 may combine and output the signals of the subpixels at subpixel levels only with respect to a particular unit pixel and output signal of pixel levels of respective sub pixels with respect to other (or the remaining) unit pixels. The electronic device 101 may selectively combine signals of subpixels within the unit pixel of the pixel array 431 of the image sensor 430. For example, in the fourth mode, image data of an R pixel or B pixel level is output by combining signals of subpixels including R pixels or B pixels, and information for calculating a phase difference between subpixels using signals acquired in respective subpixels including G pixels and image data of a G pixel level through combining or averaging the signals acquired in the G pixels may be output. The G pixel may have a weighted value larger than that of the R pixel and the B pixel. For example, human eyes have the highest sensitivity to green. For this reason, the weighted value of the G pixel may be 0.7, the weighted value of the R pixel may be 0.2, and the weighted value of the B pixel may be 0.1. Accordingly, in the fourth mode, image data of the unit pixel level may be output by combining the signals of the subpixels including the R pixels and the B pixels at the subpixel levels and signals of respective subpixels levels may be output with respect to the G pixels.

In operation 748, the electronic device 101 may generate information for calculating a phase difference between subpixels within the unit pixel. For example, the electronic device 101 may output information for calculating a phase difference between pixels by using the signals acquired in the subpixels within the G pixel. The information may include filtered data for calculating the phase difference.

In operation 750, the electronic device 101 may generate image data of the unit pixel level. For example, the electronic device 101 may gather image data generated in the R pixel, image data generated in the G pixel, and image data generated in the B pixel. In operation 752, the electronic device 101 may output the gathered image data and information. The electronic device 101 (e.g., image sensor 430) may generate the image data at a high frame rate (e.g., 60 frames per second) in the fourth mode faster than the first mode.

In the fourth mode, the generated data and the information for calculating the phase difference may be output individually or simultaneously. The fourth mode may be applied to a scenario (e.g., continuous shooting or sports) that simultaneously uses, for example, high speed image processing (e.g., 60 frames per second) and subpixel information (e.g., information for calculating the phase difference). The fourth mode may have a smaller amount of data that should be output through an interface line, for example, compared to the first mode. Alternatively, the fourth mode may operate with low power (e.g., 100% reduction compared to the first mode) by reducing a clock (e.g., 60% reduction compared to the first mode) and reducing a pixel resolution (e.g., ½ resolution compared to the first mode), and may increase a frame rate (e.g., double speed with respect to a maximum interface speed compared to the first mode) into a maximum speed.

According to various embodiments, the electronic device 101 may output in real time image data based on a changed mode in accordance with generation of the mode change while the image data is output through the display 160.

FIG. 8A illustrates an example in which the unit pixel of the image sensor includes two subpixels according to an embodiment of the present disclosure, and FIG. 8B illustrates an example in which the unit pixel of the image sensor includes four subpixels according to an embodiment of the present disclosure.

Referring to FIGS. 8A and 8B, the image sensor 430, according to an embodiment of the present disclosure, may include a plurality of unit pixels, and each unit pixel may include a plurality of subpixels. The pixel marked by R may perform an operation for acquiring a pixel image for a red color, the pixel marked by G may perform an operation for acquiring a pixel image for a green color, and the pixel marked by B may perform an operation for acquiring a pixel image for a blue color.

Human eyes have the highest sensitivity to the green color, so the G pixel may mainly use two filters.

One unit pixel may include two or more subpixels (e.g., photodiodes). Each unit pixel may include at least one micro lens. Further, each unit pixel may include at least one color filter. The color filter may be located between the micro lens and the subpixel. The subpixel may receive light having a visible ray of at least some area having passed through the micro lens and the color filter, and may output the light as data. Accordingly, the unit pixel may output one sub pixel level signal and include a plurality of pieces of data in one pixel.

The unit pixel may combine signals of two or more subpixel levels included in the unit pixel, and may output the added signal as one piece of data. Further, the unit pixel may output phase difference information for calculating a phase difference of light incident to the included two or more subpixels. The information may include filtered data for calculating the phase difference. For example, in a case of the pixel including two subpixels as illustrated in FIG. 8A, the information may include information for calculating a phase difference between left and right pixels. Further, when the pixel includes four subpixels as illustrated in FIG. 8B, the information may include information for calculating a phase difference between top and bottom pixels by using top and bottom subpixels and information for calculating a phase difference between left and right pixels by using left and right subpixels. The information may include information for calculating a phase difference by using subpixels located diagonally. The information may output only information for calculating a phase difference between pixels of a particular color. For example, only in the G pixel that receives a relatively large amount of light among RGB pixels, the color information and the information for calculating the phase difference are output. In the remaining R pixel and B pixel, only the color information may be output.

Although the Bayer pattern based on the red color, the green color, and the blue color is illustrated for the pixel array, the present disclosure is not limited thereto and various filter patterns may be used.

Each unit pixel may include an optical detection element and a filter. The pixel R may include a filter which allows a red light and/or an infrared light to pass therethrough, the pixel G may include a green light filter, and the pixel B may include a blue light filter. Each unit pixel may penetrate, for example, not only the red light, the green light, or the blue light but also the infrared light, so that detection information generated by the light having passed through each pixel may include noise by the infrared light. When noise by the infrared light is small in the detection information, color information may be acquired, for example, based on the detection information. Unlike the above, when it is required to remove noise by the infrared light, detection information from which the noise by the infrared light is removed may be generated through a proper processing procedure and color information may be acquired based on the generated detection information.

Figure 9:
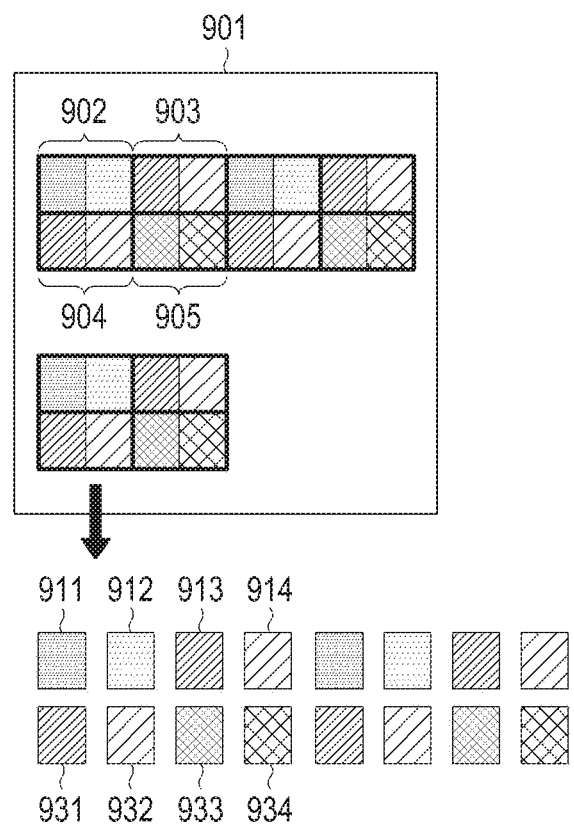
FIG. 9 illustrates an example of a process for outputting image data in a first mode according to an embodiment of the present disclosure.

FIG. 9 illustrates an example of a process for outputting image data in a first mode according to an embodiment of the present disclosure.

Referring to FIG. 9, the controller 440 may output signals of subpixel levels included in a plurality of unit pixels of the image sensor 430, and may generate or output data. The controller 440 may output, for example, a signal of a subpixel level from each of a plurality of subpixels included in each unit pixel. A pixel array 901 of the image sensor 430 may include a plurality of unit pixels 902, 903, 904, and 905, and each unit pixel may include a plurality of subpixels. For example, each unit pixel may include two photodiodes. Alternatively, each unit pixel may include four photodiodes. For example, a first unit pixel 902 may include two subpixels. The first unit pixel 902 may be the R pixel, a second unit pixel 903 may be the G pixel, a third unit pixel 904 may be the G pixel, and a fourth unit pixel 905 may be the B pixel.

The R pixel 902 may include two subpixels (e.g., photodiodes), and may output a signal 911 of a first subpixel level and/or a signal 912 of a second subpixel level. Further, the G pixel 903 may include two subpixels (e.g., photodiodes), and may output a signal 913 of a third subpixel level and a signal 914 of a fourth subpixel level.

The G pixel 904 may include two subpixels (e.g., photodiodes), and may output a signal 931 of a fifth subpixel level and/or a signal 932 of a sixth subpixel level. Further, the B pixel 905 may include two subpixels (e.g., photodiodes), and may output a signal 933 of a seventh subpixel level and/or a signal 934 of an eighth subpixel level.

Figure 10:
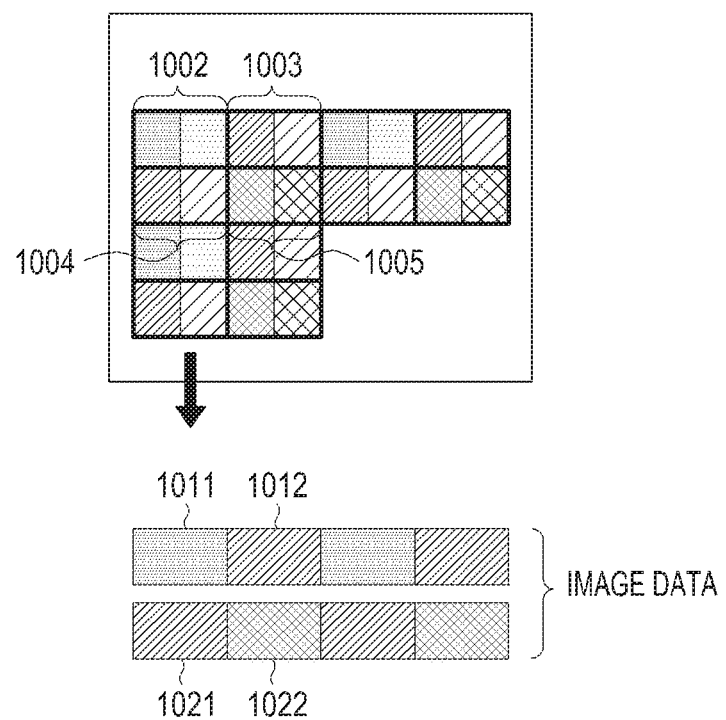
FIG. 10 illustrates an example of a process for outputting image data in a second mode according to an embodiment of the present disclosure.

FIG. 10 illustrates an example of a process for outputting image data in a second mode according to an embodiment of the present disclosure.

Referring to FIG. 10, the electronic device 101 may output only image data of the unit pixel level by combining signals of subpixels within the unit pixel of the image sensor 430. In this case, a number of pieces of data becomes smaller compared to the case of FIG. 9, so that only the image data may be output at a high speed. The pixel array of the image sensor 430 may include a plurality of unit pixels, and each unit pixel may include a plurality of subpixels. For example, each unit pixel may include two photodiodes. Alternatively, each unit pixel may include four photodiodes. For example, each of a first unit pixel to a fourth unit pixel 1002, 1003, 1004, and 1005 may include two subpixels. The first unit pixel 1002 may be the R pixel, the second unit pixel 1003 may be the G pixel, the third unit pixel 1004 may be the G pixel, and the fourth unit pixel 1005 may be the B pixel.

The R pixel 1002 may include two subpixels (e.g., photodiodes), and may output image data 1011 of the unit pixel level by combining signals in respective subpixels. The G pixel 1003 may include two subpixels (e.g., photodiodes), and output image data 1012 of the unit pixel level by combining signals of respective subpixels. Further, each unit pixel according to the line may combine and output signals of respective sub pixels. The G pixel 1004 may include two subpixels (e.g., photodiodes) and output image data 1021 of the unit pixel level by combining data of respective subpixels, and the B pixels 1005 may include two subpixels (e.g., photodiodes) and output image data 1022 of the unit pixel level by combining data of respective subpixels.

The electronic device 101 may generate image data of the unit pixel level by combining signals of the plurality of subpixels. Further, the electronic device 101 may also output image data of the unit pixel level generated in each unit pixel. The electronic device 101 may generate image data by combining light amounts by respective subpixels included in the R pixel 1002, and may generate image data 1012 by combining light amounts by respective subpixels included in the G pixel 1003. Further, the electronic device 101 may combine the image data 1011 and 1012. In addition, the electronic device 101 may generate image data 1021 by combining data by respective subpixels included in the G pixel 1004, and may generate image data 1022 by combining data by respective subpixels included in the B pixel 1005.

The second mode may be applied to a scenario (for example, continuous shooting) for acquiring only image data at a high speed. In this case, since summing of subpixels includes unit pixels, noise is small and thus high definition image data may be acquired. Further, the electronic device 101 may not generate or output, for example, information for calculating a phase difference between subpixels within the unit pixel.

Figure 11A:
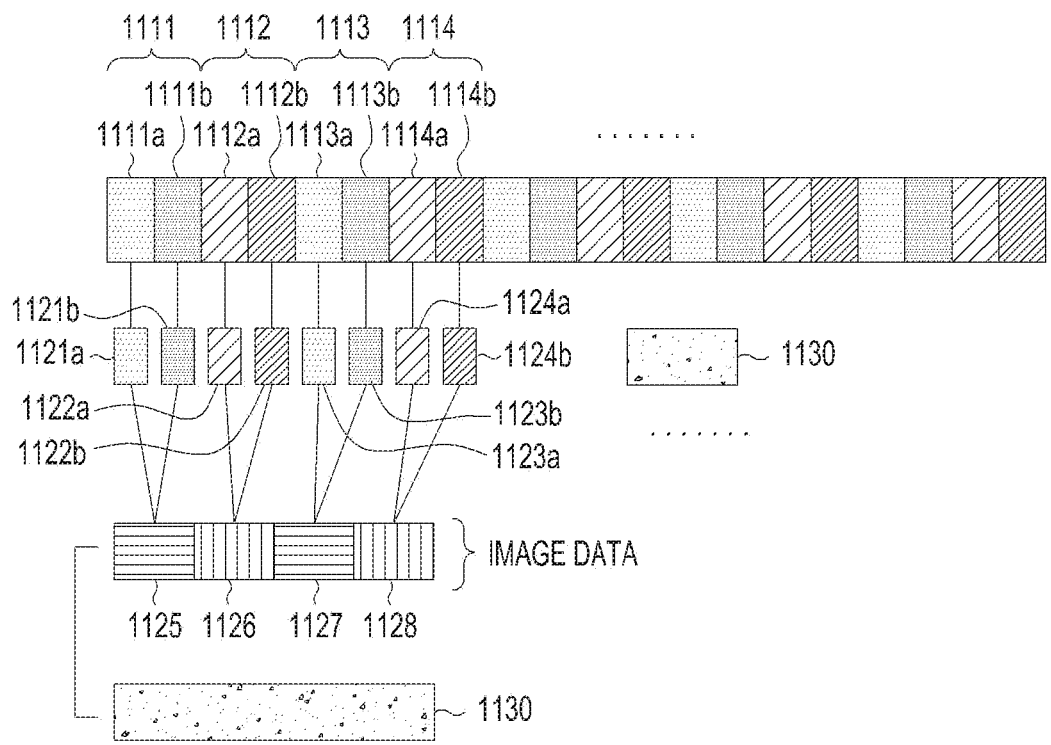
FIG. 11A illustrates an example of a process for outputting image data in a third mode according to an embodiment of the present disclosure.
Figure 11A:
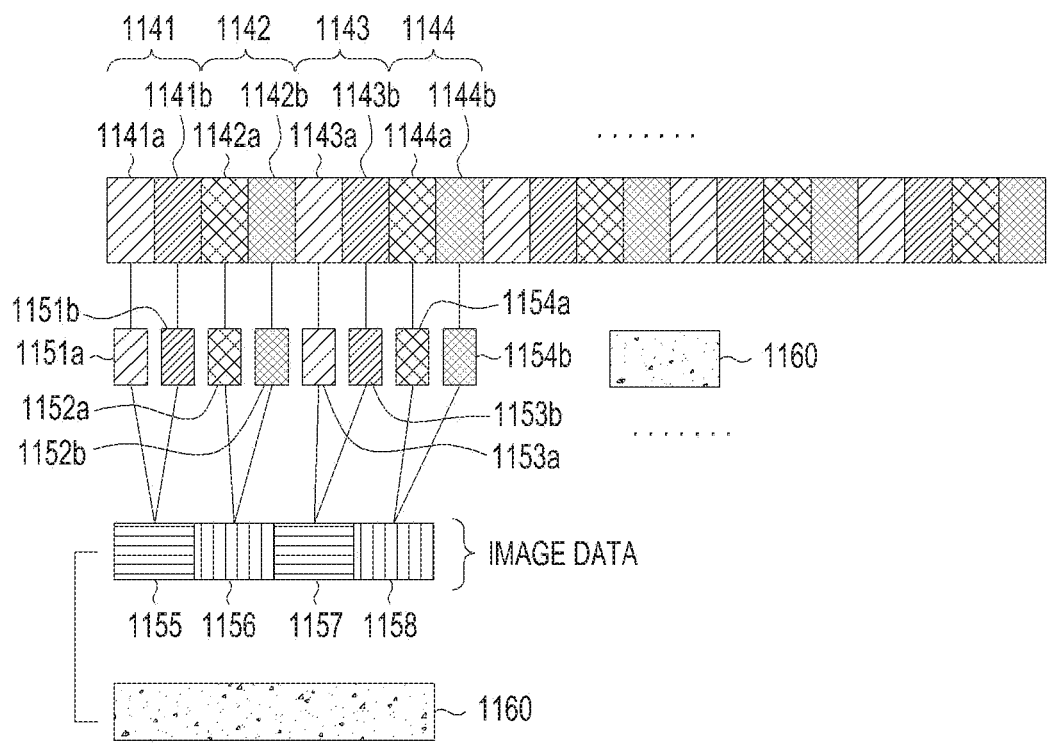

FIG. 11A illustrates an example of a process for outputting image data in a third mode according to an embodiment of the present disclosure.

Figure 11B:
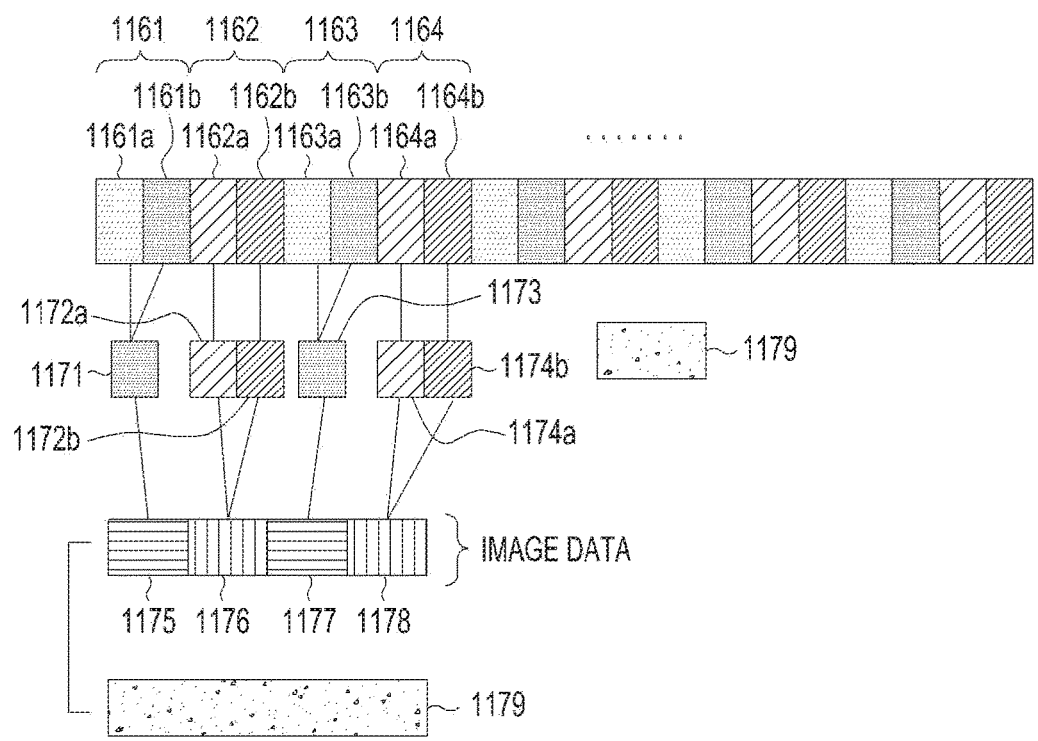
FIG. 11B illustrates an example of a process for outputting image data in a fourth mode according to an embodiment of the present disclosure.
Figure 11B:
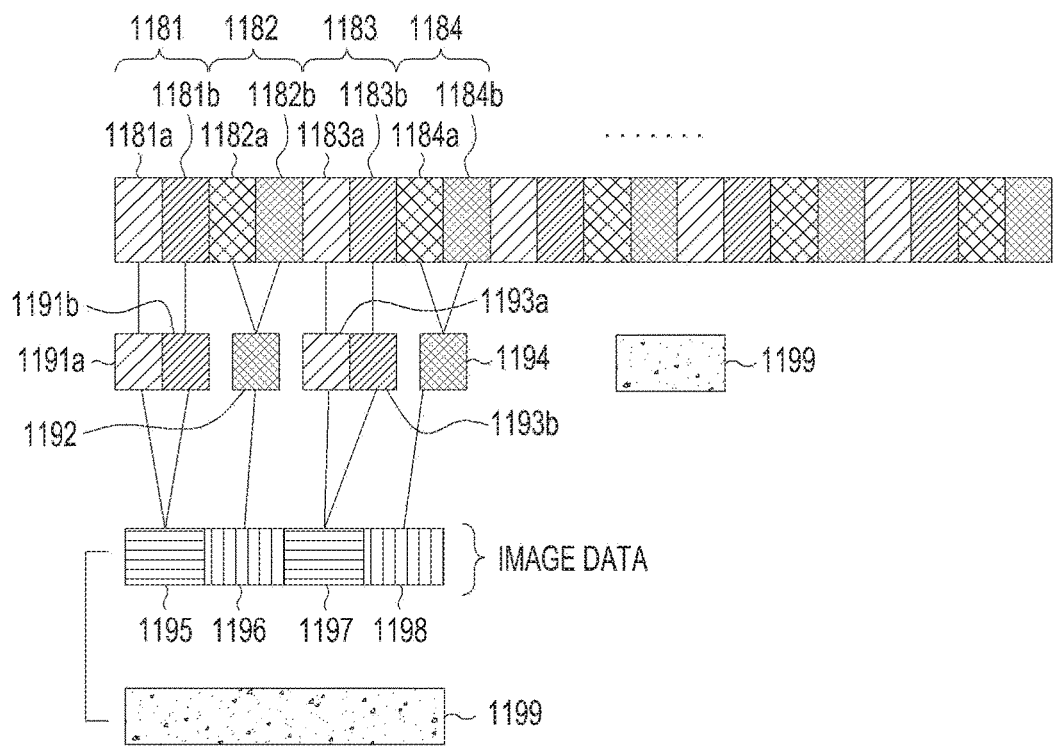

FIG. 11B illustrates an example of a process for outputting image data in a fourth mode according to an embodiment of the present disclosure.

Referring to FIG. 11A, the electronic device 101 (e.g., image sensor 430) may acquire signals 1121a, 1121b, 1122a, 1122b, 1123a, 1123b, 1124a, and 1124b from subpixels 1111a, 111b, 1112a, 1112b, 1113a, 1113b, 1114a, and 1114b of unit pixels 1111, 1112, 1113, and 1114. The electronic device 101 may generate information 1130 for calculating a phase difference by using the acquired signals 1121a, 1121b, 1122a, 1122b, 1123a, 1123b, 1124a, and 1124b. The electronic device 101 may generate image data of the unit pixel level by combining or averaging signals acquired from the plurality of subpixels of each unit pixel. The electronic device 101 may generate first image data 1125 of the unit pixel level by combining or averaging the signals 1121a and 1121b acquired from the subpixels 1111a and 1111b of the first unit pixel 1111, generate second image data 1126 of the unit pixel level by combining or averaging the signals 1122a and 1122b acquired from the subpixels 1112a and 1112b of the second unit pixel 1112, generate third image data 1127 of the unit pixel level by combining or averaging the signals 1123a and 1123b acquired from the subpixels 1113a and 1113b of the third unit pixel 1113, and generate fourth image data 1128 of the unit pixel level by combining or averaging the signals 1124a and 1124b acquired from the subpixels 1114a and 1114b of the fourth unit pixel 1114. Further, the electronic device 101 may output the generated image data 1125, 1126, 1127, and 1128 and the information 1130. For example, the generated image data 1125, 1126, 1127, and 1128 and the information 1130 may be output individually or simultaneously.

The electronic device 101 (e.g., controller 440) may acquire signals 1151a, 1151b, 1152a, 1152b, 1153a, 1153b, 1154a, and 1154b from subpixels 1141a, 141b, 1142a, 1142b, 1143a, 1143b, 1144a, and 1144b of unit pixels 1141, 1142, 1143, and 1144. The electronic device 101 may generate information 1160 for calculating a phase difference by using the acquired signals 1151a, 1151b, 1152a, 1152b, 1153a, 1153b, 1154a, and 1154b. The electronic device 101 may generate image data of the unit pixel level by combining or averaging signals acquired from the plurality of subpixels of each unit pixel. The electronic device 101 may generate fifth image data 1155 of the unit pixel level by combining or averaging the signals 1151a and 1151b acquired from the subpixels 1141a and 1141b of the fifth unit pixel 1141, generate sixth image data 1156 of the unit pixel level by combining or averaging the signals 1152a and 1152b acquired from the subpixels 1142a and 1142b of the sixth unit pixel 1142, generate seventh image data 1157 of the unit pixel level by combining or averaging the signals 1153a and 1153b acquired from the subpixels 1143a and 1143b of the seventh unit pixel 1143, and generate eighth image data 1158 of the unit pixel level by combining or averaging the signals 1154a and 1154b acquired from the subpixels 1144a and 1144b of the eighth unit pixel 1144. Further, the electronic device 101 may output the generated image data 1155, 1156, 1157, and 1158 and the information 1160. For example, the generated image data 1155, 1156, 1157, and 1158 and the information 1160 may be output individually or simultaneously. The generated first image data to eighth image data 1125, 1126, 1127, 1128, 1155, 1156, 1157, and 1158 and the information 1130 and 1160 may be output together.

The pixel array 431 of the image sensor 430 may include a plurality of unit pixels, and each unit pixel may include a plurality of subpixels. For example, each unit pixel may include two photodiodes. Alternatively, each unit pixel may include four photodiodes. The controller 440 may combine or average signals of subpixels within the unit pixel included in the image sensor 430. The controller 440 may simultaneously output the combined data or averaged data and information for calculating a phase difference between the subpixels within each unit pixel. Further, the first unit pixel 1111 may include the R pixel, and the second unit pixel 1112 may include the G pixel. The third unit pixel 1113 may include the R pixel, and the fourth unit pixel 1114 may include the G pixel. The fifth unit pixel 1141 may include the G pixel, and the sixth unit pixel 1142 may include the B pixel. The seventh unit pixel 1143 may include the G pixel, and the eighth unit pixel 1144 may include the B pixel.

The electronic device 101 (e.g., image sensor 430) may generate information for calculating a phase difference between subpixels of each unit pixel.

Referring to FIG. 11B, the electronic device 101 (e.g., image sensor 430) may output image data 1175 of the unit pixel level by combining signals of subpixels 1161a and 1161b of a first unit pixel 1161 at the subpixel level as indicated by reference numeral 1171, and may individually output signals 1172a and 1172b acquired from subpixels 1162a and 1162b of a second unit pixel 1162 without combining the signals. The electronic device 101 (e.g., controller 440) may generate information 1179 for calculating a phase difference by using the signals 1172a and 1172b acquired from the second unit pixel 1162 and output image data 1176 of the unit pixel level by combining or averaging the acquired signals 1172a and 1172b. The electronic device 101 may output image data 1177 of the unit pixel level by combining signals of subpixels 1163a and 1163b of a third unit pixel 1163 at the subpixel level as indicated by reference numeral 1173, and may individually output signals 1174a and 1174b acquired from subpixels 1164a and 1164b of a fourth unit pixel 1164 without combining the signals. The electronic device 101 may generate information 1179 for calculating a phase difference by using the signals 1174a and 1174b acquired from the fourth unit pixel 1164 and output image data 1178 of the unit pixel level by combining or averaging the acquired signals 1174a and 1174b. Further, the electronic device 101 may output the generated image data 1175, 1176, 1177, and 1178 and the information 1179. For example, the generated image data 1175, 1176, 1177, and 1178 and the information 1179 may be output individually or simultaneously.

The electronic device 101 may individually output signals 1191a and 1191b acquired from subpixels 1181a and 1181b of a fifth unit pixel 1181 without combining the signals, and may output image data 1192 of the unit pixel level by combining signals of subpixels 1182a and 1182b of a sixth unit pixel 1182 at the subpixel level. The electronic device 101 may generate, for example, information 1199 for calculating a phase difference by using the signals 1191a and 1191b acquired from the fifth unit pixel 1181 and output image data 1194 of the unit pixel level by combining or averaging the acquired signals 1191a and 1191b. Further, the electronic device 101 may individually output signals 1193a and 1193b of subpixels 1183a and 1183b of a seventh unit pixel 1183 without combining the signals, and output image data 1197 of the unit pixel level by combining signals of subpixels 1184a and 1184b of an eighth unit pixel 1184 at the subpixel level. The electronic device 101 may generate, for example, information 1199 for calculating a phase difference by using the signals 1193a and 1193b acquired from the seventh unit pixel 1183 and output image data 1194 of the unit pixel level by combining or averaging the acquired signals 1191a and 1191b. Further, the electronic device 101 may output, for example, the generated image data 1195, 1196, 1197, and 1198 and the information 1199. For example, the generated image data 1194, 1195, 1196, and 1197 and the information 1199 may be output individually or simultaneously. According to various embodiments, the 1175, 1176, 1177, 1178, 1195, 1196, 1197, and 1198 of the unit pixel level generated in respective unit pixels may be combined and output, and the information 1179 and 1199 for calculating the phase difference between the subpixels within the second unit pixel and between the subpixels within the fourth unit pixel may be added to the combined image data and transmitted.

The first unit pixel 1161 may include the R pixel, and the second unit pixel 1162 may include the G pixel. The third unit pixel 1163 may include the R pixel, and the fourth unit pixel 1164 may include the G pixel. The fifth unit pixel 1181 may include the G pixel, and the sixth unit pixel 1182 may include the B pixel. The seventh unit pixel 1183 may include the G pixel, and the eighth unit pixel 1184 may include the B pixel. As described above, in the fourth mode, the image data generated by selectively combining the signals of the subpixels within the first unit pixel (or the third unit pixel, the sixth unit pixel, or the eighth unit pixel), the information generated for calculating the phase difference between the pixels using the signals acquired from the subpixels within the second unit pixel (or the fourth unit pixel, the fifth unit pixel, or the seventh unit pixel), and the image data generated by combining or averaging the acquired signals may be combined and output.

According to various embodiments, the electronic device 101 (for example, image sensor 430) may generate information for calculating a phase difference between subpixels (for example, between subpixels 1162a and 1162b, between subpixels 1164a and 1164b, between subpixels 1181a and 1181b, and between subpixels 1183a and 1183b) of the G pixels 1162, 1164, 184, and 1183. The information may be information for calculating the phase difference between the subpixels and may include filtered data.

The fourth mode, according to various embodiments, may include an output mode (e.g., sports or video) having a high frame rate (60 frame per second) and a phase difference between subpixels. The fourth mode may be applied to a scenario (e.g., continuous shooting or sports) using high speed image processing and information for calculating the phase difference between subpixels. For example, when AF is required during a high speed preview (e.g., high speed image processing or 60 frames per second), the fourth mode is executed. The fourth mode may have a smaller amount of data which should be output through an interface line compared to the first mode, the fourth mode may be executed with low power (e.g., 10% reduction compared to the first mode) by reducing a clock (e.g., 60% reduction compared to the first mode) and reducing a pixel resolution (e.g., ½ resolution compared to the first mode). Further, the fourth mode may perform an output at a maximum speed supported by the interface, thereby increasing a frame rate. In such a fourth mode, for example, data output from some subpixels may be combined and output, and thus an output speed may increase compared to the first mode.

Figure 12:
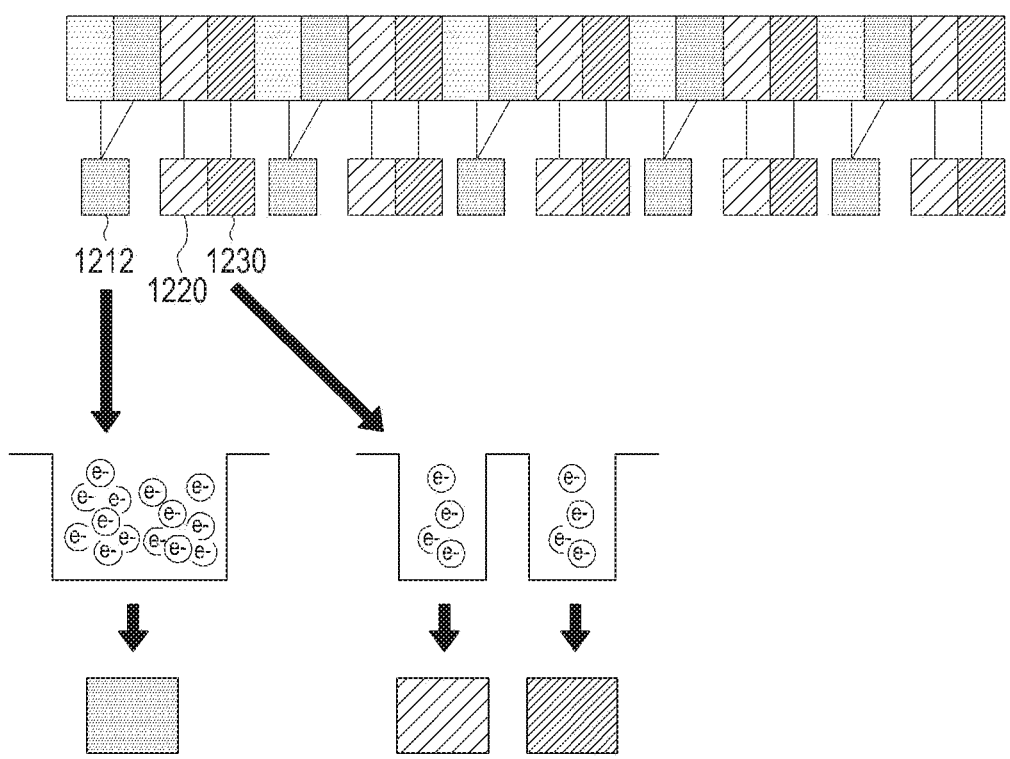
FIG. 12 illustrates an example of a process for selectively combining signals of a subpixel level in the fourth mode according to an embodiment of the present disclosure.

FIG. 12 illustrates an example of a process for selectively combining signals of the subpixel level in the fourth mode according to an embodiment of the present disclosure.

Referring to FIG. 12, the electronic device 101 (e.g., image sensor 430) may combine signals acquired through two subpixels of the unit pixel (e.g., R pixel) at the subpixel level as indicated by reference numeral 1212, charge the signal in a capacitor of the corresponding photodiode, and perform a lead-out output. Further, the electronic device 101 (e.g., controller 440) may charge signals 1220 and 1230 acquired though respective subpixels of the two subpixels of the unit pixel (for example, G pixel) in respective capacitors of the corresponding photodiode and perform a lead-out output. In FIG. 12, in order to further improve the output speed of the fourth mode, image data of the unit pixel level may be output by selectively combining signals of some pixels, so that the image data may be generated faster than the third mode and simultaneously a phase difference between subpixels within the G pixel may be output.

Figure 13A:
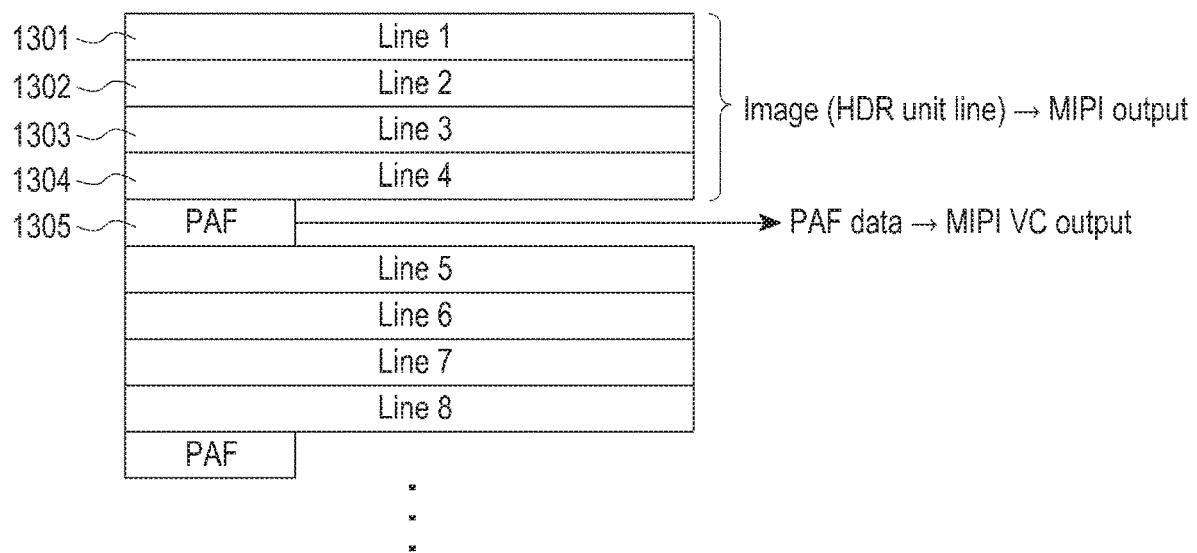
FIG. 13A illustrates an example of a channel for transmitting generated data and/or information for calculating a phase difference according to an embodiment of the present disclosure.

FIG. 13A illustrates an example of a channel (e.g., a mobile industry processor interface (MIPI) or an MIPI virtual channel (VC) for transmitting the generated image data and/or the information for calculating the phase difference according to an embodiment of the present disclosure.

Figure 13B:
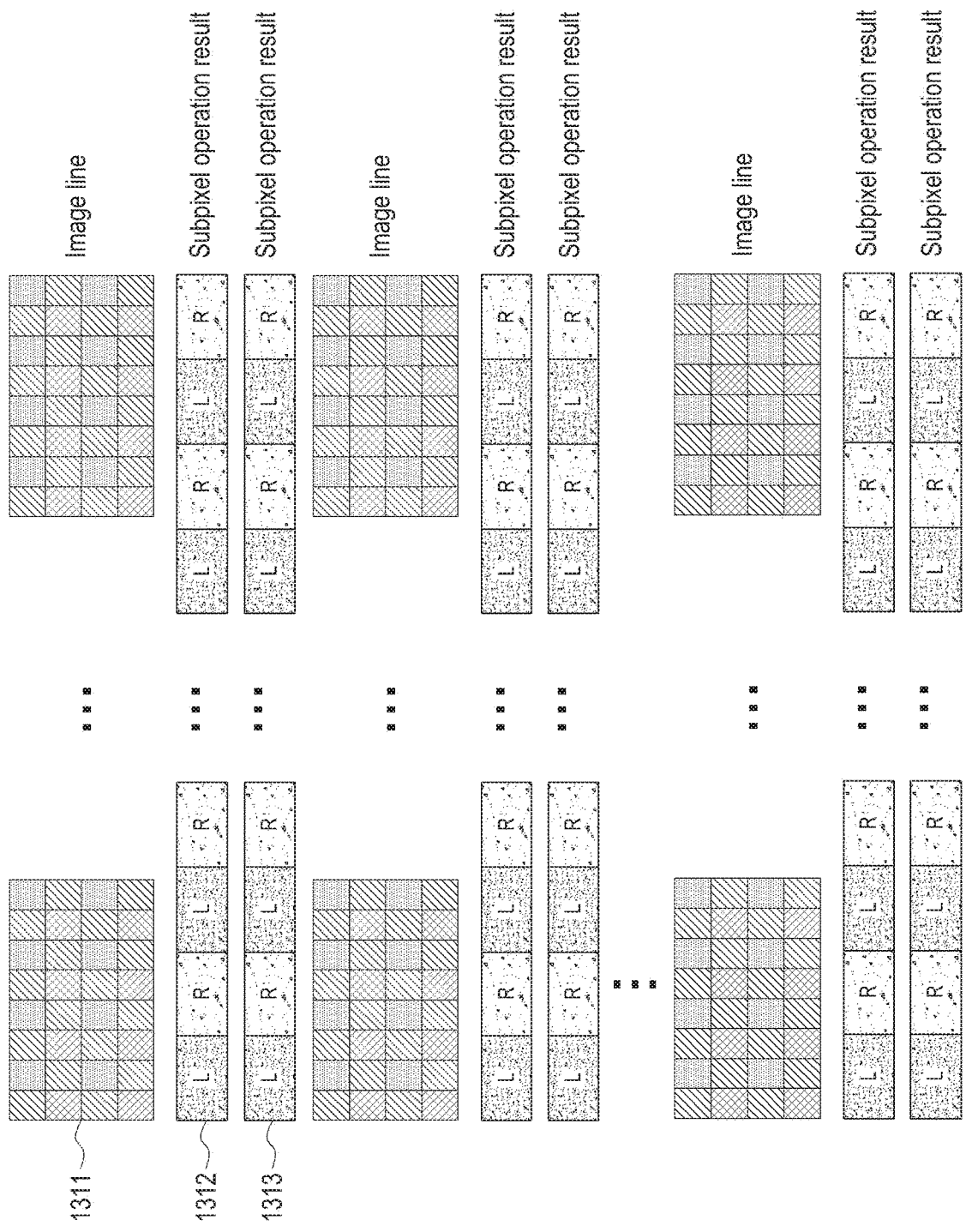
FIG. 13B illustrates an example for transmitting image data and information for calculating a phase difference through a predetermined channel according to an embodiment of the present disclosure.

FIG. 13B illustrates an example for transmitting image data and information for calculating a phase difference through a predetermined channel (e.g., MIPI or MIPI VC) according to an embodiment of the present disclosure.

Referring to FIGS. 13A and 13B, the electronic device (e.g., controller 440) may transmit information 1312 and 1313 for calculating a phase difference that is generated using four lines 1311 for transmitting image data and all unit pixels related to the four lines 1311 for transmitting the image data.

Figure 13C:
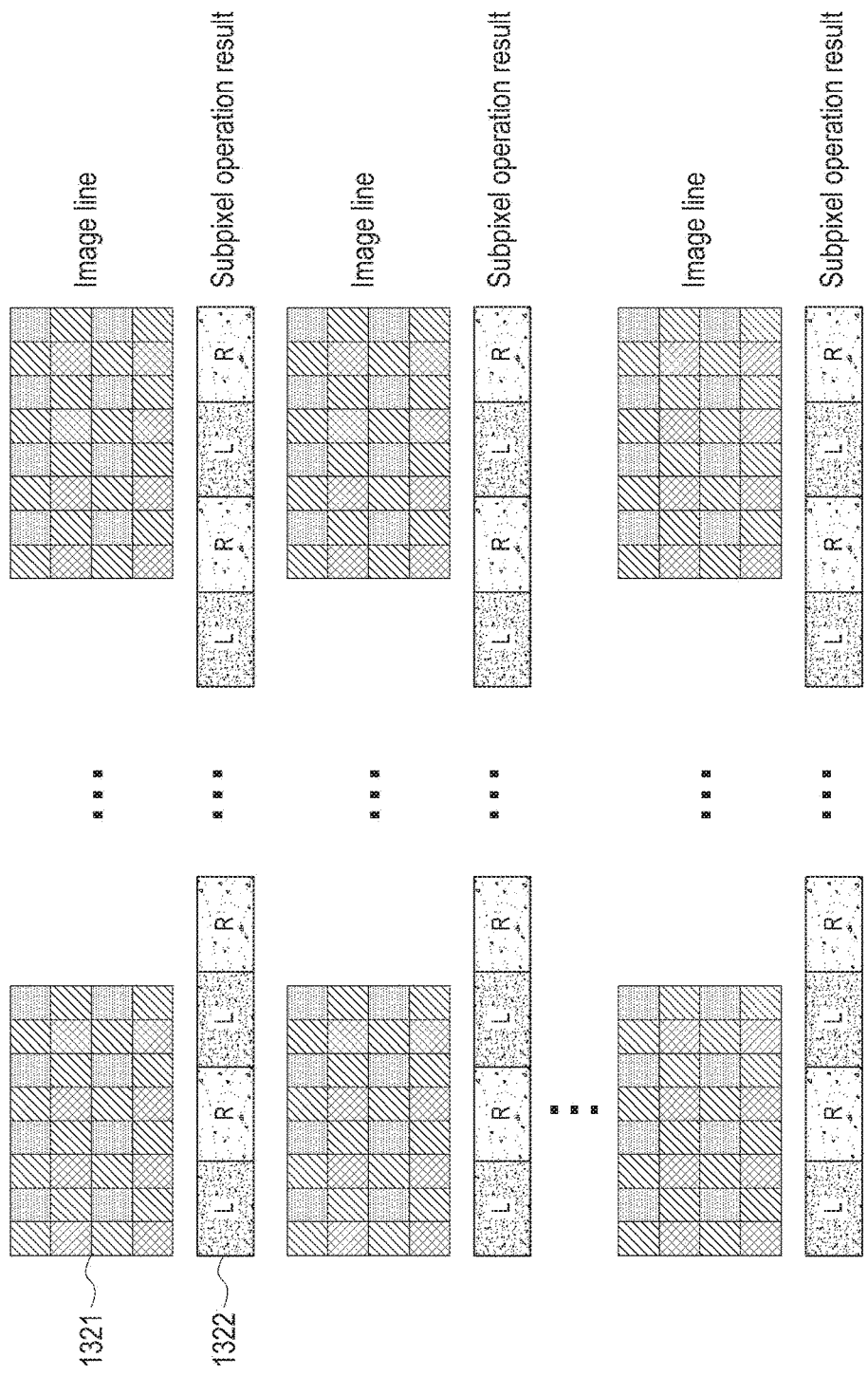
FIG. 13C illustrates an example for transmitting image data and information for calculating a phase difference through a predetermined channel according to an embodiment of the present disclosure.

FIG. 13C illustrates an example for transmitting image data and information for calculating a phase difference through a predetermined channel (e.g., MIPI or MIPI VC) according to an embodiment of the present disclosure.

Referring to FIG. 13C, the electronic device (e.g., controller 440) may transmit information 1322 for calculating a phase difference that is generated using four lines 1321 for transmitting image data and some unit pixels related to the four lines 1321 for transmitting the image data. The four lines 1311 and 1321 for transmitting the image data and lines for transmitting the information 1312, 1313, and 1322 for calculating the phase difference may be different. The four lines 1311 and 1321 for transmitting the image data may use, for example, the MIPI, and the information 1312, 1313, and 1322 for calculating the phase difference may use the MIPI VC.

Referring to FIGS. 13A to 13C, the image data generated according to an embodiment of the present disclosure may be transmitted through a first line to a fourth line 1301, 1302, 1303, and 1304, and the information may be transmitted through a separate channel 1305. Alternatively, the image data generated according to an embodiment of the present disclosure may be transmitted through at least one of the first line to the fourth line 1301, 1302, 1303, and 1304.

Referring to FIG. 13B, the electronic device (e.g., controller 440) may transmit image data 1311 and information 1312 and 1313 for calculating the phase difference generated using all unit pixels related to the image data 1311. The image data 1311 and the information 1312 and 1313 for calculating the phase difference may be transmitted through one channel or different channels. When the image sensor 430 does not provide a high dynamic range (HDR), information 1312 and 1313 for calculating a phase difference may be generated using all unit pixels related to the image data 1311 as illustrated in FIG. 13B. The image data 1311 may include the first to fourth lines 1301, 1302, 1303, and 1304 illustrated in FIG. 13A. Further, the information 1312 and 1313 for calculating the phase difference may include PAF data illustrated in FIG. 13A.

Referring to FIG. 13C, the electronic device (e.g., controller 440) may transmit image data 1321 and information 1322 for calculating a phase difference generated using some of all unit pixels related to the image data 1321. The image data 1321 and the information 1322 for calculating the phase difference may be transmitted through one channel or different channels. When the image sensor 430 provides a HDR, the controller 440 may generate information 1322 for calculating a phase difference by using some of all unit pixels (e.g., pixels supporting long exposure) related to the image data 1321 as illustrated in FIG. 13C. The image data 1321 may include the first to fourth lines 1301, 1302, 1303, and 1304 illustrated in FIG. 13A. Further, the information 1322 for calculating the phase difference may include PAF data illustrated in FIG. 13A.

According to various embodiments of the present disclosure, the controller 440 may efficiently generate phase difference information (e.g., information calculated using information for calculating the phase difference) by simultaneously or sequentially transmitting image data and information for calculating the phase difference. For example, the controller 440 may prevent the problem of omitting the phase difference information or delaying a time when the phase difference information is generated by simultaneously or sequentially transmitting image data and information for calculating the phase difference. The controller 440 may prevent the problem (generation of a time difference of 1 frame) generated when the information for calculating the phase difference is transmitted after all the image data is transmitted by simultaneously or sequentially transmitting the four lines 1311 and 1321 of the image data and the information 1312, 1313, and 1322 for calculating the phase difference.

Figure 14:
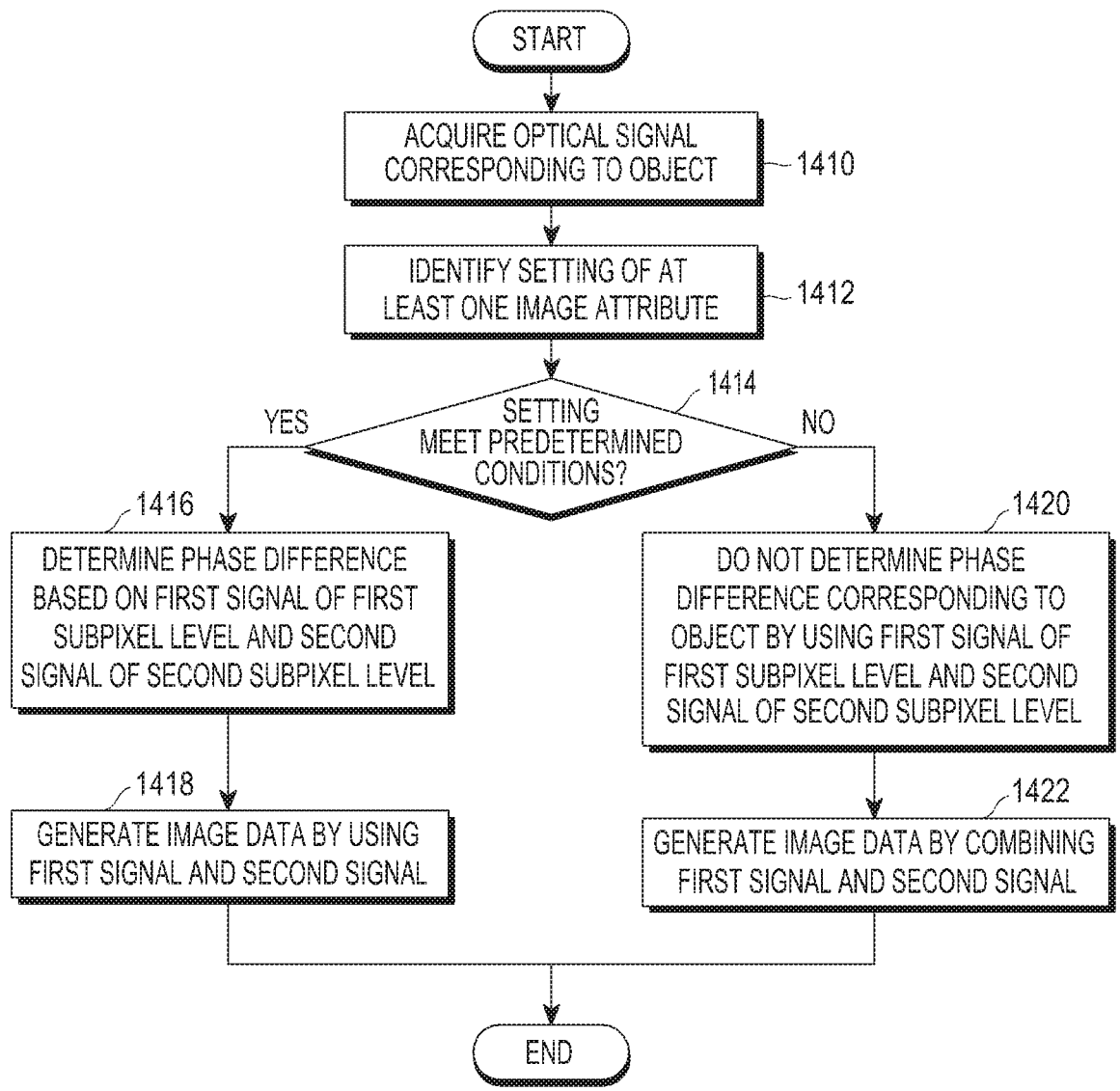
FIG. 14 is a flowchart illustrating an operation for generating an image according to an embodiment of the present disclosure.

FIG. 14 is a flowchart illustrating an operation for generating an image according to an embodiment of the present disclosure.

Referring to FIG. 14, the electronic device 101 (e.g., image sensor 430) may acquire, for example, an optical signal corresponding to an object in operation 1410. The optical signal may include various information required for generating image data by using signals acquired from respective subpixels included in the image sensor 430 of the electronic device 101. The electronic device 101 (e.g., controller 440) may generate information for calculating a phase difference between subpixels through the signals acquired from the subpixels and (or) generate image data. The image sensor 430 may include a plurality of unit pixels, and each unit pixel may include one of the R pixel, the G pixel, and the B pixel.

The electronic device 101 may identify a setting of at least one image attribute in operation 1412. For example, the electronic device 101 may identify the image attribute of an image to be output through the display 160. The image attribute may include an object size, a distance between the object and the image sensor, a movement speed of the object, a frame rate of the image to be output, or a combination thereof. The electronic device 101 may identify the image attribute to determine or not determine the phase difference through the signals corresponding to the respective subpixels.

The electronic device 101 may determine whether the setting meets predetermined conditions in operation 1414. When the setting meets the predetermined conditions the electronic device 101 may control or set at least one element of the electronic device 101 to generate image data by using a first signal of a first subpixel and a second signal of a second subpixel.

The electronic device 101 (e.g., image sensor 430) may determine a phase difference corresponding to the object by using the first signal of the first subpixel and the second signal of the second subpixel in operation 1416. The electronic device 101 (e.g., controller 440) may generate image data by using the first signal and the second signal in operation 1418. The electronic device 101 may generate image data of the unit pixel level by using the first signal and the second signal. For example, the electronic device 101 may generate the image data by combining the first signal and the second signal or using an average value of the first signal and the second signal.

When the setting does not meet the predetermined conditions in operation 1414 (e.g., when the setting is within a second predetermined range), the electronic device 101 may not determine, for example, the phase difference corresponding to the object by using the first signal of the first subpixel and the second signal of the second subpixel in operation 1420. Further, in operation 1422, the electronic device 101 may generate image data by combining the first signal and the second signal. The electronic device 101 may generate image data of the unit pixel level by combining, for example, the first signal and the second signal. A case where the setting does not meet the predetermined conditions may include a case where the setting meets other predetermined conditions.

Figure 15:
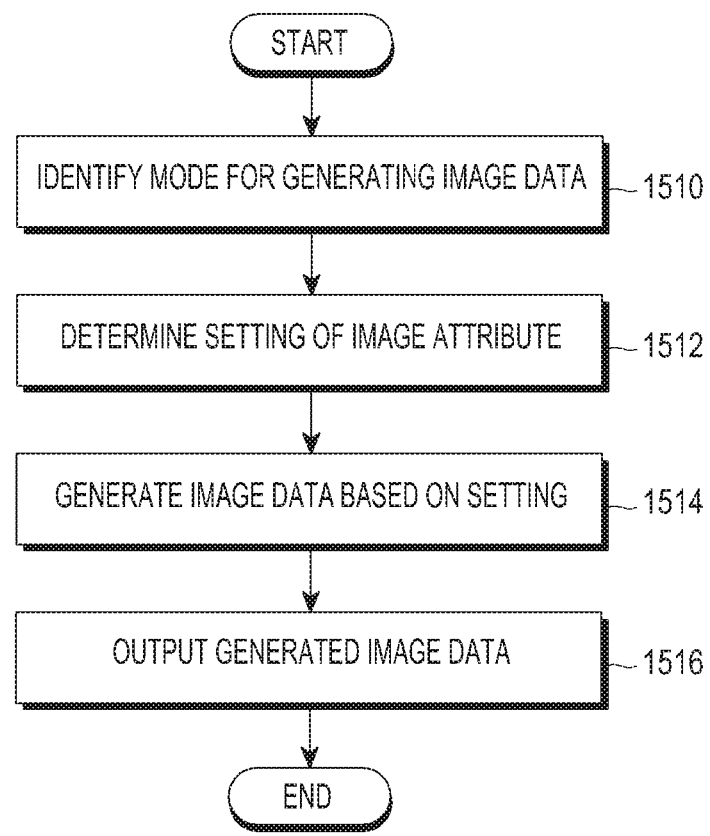
FIG. 15 is a flowchart illustrating an operation for generating image data according to another embodiment of the present disclosure.

FIG. 15 is a flowchart illustrating an operation for generating image data according to an embodiment of the present disclosure.

Referring to FIG. 15, the operation for generating the image data may include an operation for identifying a mode for generating image data, an operation for determining a setting of image attributes, an operation for generating the image data based on the setting, and an operation for outputting the generated image data.

Referring to FIG. 15, the electronic device 101 (e.g., controller 440) may identify the mode for generating image data in operation 1510. The electronic device 101 may determine the mode for generating the image data that matches conditions selected by the user. Alternatively, the electronic device 101 may selectively execute the mode according to a user's situation or attributes of a photographed image. The attributes of the image may vary depending on sports, person, landscape, or video, and the electronic device 101 may selectively operate in accordance with the mode according to the attributes.

The electronic device 101 (e.g., controller 440) may identify whether the mode for generating the image data corresponds to a first mode in which signals of a plurality of subpixels included in at least one unit pixel among a plurality of unit pixels are individually output. The electronic device 101 may identify a second mode in which signals of a plurality of subpixels within each unit pixel are combined at the subpixel level and image data of the unit pixel level is output. The electronic device 101 may identify a third mode in which information for calculating a phase difference is generated through signals acquired from a plurality of subpixels within each unit pixel and image data of the unit pixel level is generated by combining or averaging the acquired signals. The electronic device 101 may identify a fourth mode in which signals of respective subpixels within a first unit pixel (e.g., R pixel or B pixel) are combined at the subpixel level and image data of the unit pixel level is output, information for calculating a phase difference is output by using signals acquired from respective subpixels within a second unit pixel (e.g., G pixel), and image data of the unit pixel level is output by combining or averaging the acquired signals. The first mode corresponds to a mode selected when high speed AF (e.g., AF using phase difference information) is needed, and the second mode corresponds to a mode selected when a high frame rate (60 frames per second) is needed. The third mode and the fourth mode correspond to modes selected when the high speed AF (e.g., AF using phase difference information) and the high frame rate (e.g., 60 frames per second) are needed. The fourth mode corresponds to a mode in which image data may be generated at a higher frame rate compared to the first mode and image data of each unit pixel level and information for calculating a phase difference between subpixels within the G pixel may be generated. In the fourth mode, image data of the unit pixel level may be generated through selective combination of signals of the subpixels and the information may be added to the generated image data and output. In the fourth mode, image data of the unit pixel level may be output through a combination of signals of subpixels included in the R pixel at the subpixel level, information for calculating a phase difference may be output by using signals acquired from respective subpixels included in the G pixel, image data of the unit pixel level may be generated by combining or averaging the acquired signals, and image data of the unit pixel level may be output through a combination of signals of respective subpixels included in the B pixel at the subpixel level. Further, in the fourth mode, the generated image data may be gathered and the information may be added to the gathered data, and then the image data and the information may be output together.

In operation 1512, the electronic device 101 may determine a setting of image attributes. The electronic device 101 may determine a setting of at least one image attribute to be used for generating image data at least based on the mode identified in operation 1512.

In operation 1514, the electronic device 101 may generate image data based on the setting. When the setting corresponds to the first mode, the electronic device 101 may provide, for example, high speed AF (e.g., AF using phase difference information) (e.g., 60 frames per second). Further, the electronic device 101 may generate image data at a low frame rate (e.g., 30 frames per second). According to an embodiment of the present disclosure, although it has been described that the low frame rate corresponds to 30 frame per second or 15 frames per second, this is only an embodiment and the low frame rate according to the present disclosure may include a lower or higher frame rate than 30 frame per second or 15 frames per second described above according to the specification of the electronic device 101 or technology development.

When the identified setting corresponds to the second mode, the electronic device 101 may generate the image at a frame rate (e.g., 60 frames per second) that is faster than the frame rate of the first mode and may not generate information for calculating a phase difference between subpixels within the unit pixel. Further, since signals acquired from respective subpixels within the unit pixel may be output in the first mode and an image of the unit pixel level may be generated and output in the second mode through a combination of signals acquired from respective subpixels within the unit pixel at the subpixel level, the second mode may have a smaller amount of data compared to the first mode, so that only the image data may be output at a high speed through the second mode. According to an embodiment of the present disclosure, although it has been described that the high frame rate corresponds to 60 frames per second, this is only an embodiment and the high frame rate according to the present disclosure may include a lower or higher frame rate than 60 frame per second described above according to the specification of the electronic device 101 or technology development.

When the identified setting corresponds to the third mode, the electronic device 101 may generate information for calculating a phase difference between subpixels within each unit pixel by using signals acquired from the subpixels within each unit pixel and may generate image data of the unit pixel level by combining or averaging the signals of the subpixels within each unit pixel at the subpixel level. For example, since the amount of processed data (or data amount) becomes smaller in the third mode compared to the first mode, the electronic device 101 may output the image data and the information for calculating the phase difference at a higher speed compared to the first mode.

When the identified setting corresponds to the fourth mode, a data amount output through the interface line may be smaller than that of the first mode. Alternatively, the fourth mode may be executed with low power (e.g., 10% reduction compared to the first mode) by reducing a clock (e.g., 60% reduction compared to the first mode) and reducing a pixel resolution (e.g., ½ resolution compared to the first mode), and may increase the frame rate into a maximum rate. The frame rate (e.g., double rate compared to the first mode with respect to a maximum interface rate) corresponding to the fourth mode is a rate for processing frames at a relatively high speed, and may include 60 frames per second. Although 60 frames per second has been described in an embodiment of the present disclosure, this is only an embodiment and the present disclosure may include a lower or higher frame rate than 60 frames per second according to the specification of the electronic device 101 or technology development.

In operation 1516, the electronic device 101 may output the generated image data. The electronic device 101 may combine and output, for example, the image data generated at each unit level in operation 1514. Further, the electronic device 101 may process, for example, the plurality of combined image data through a post-processing process and display the image data through the display 160 functionally connected to the electronic device. When the mode or the setting changes while the image data is displayed through the display 160, the electronic device 101 may generate image data by using at least one of the frame rate and the resolution corresponding to the changed setting and display the generated image data in real time.

The operations (e.g., operations 710 to 752, operations 1410 to 1422, or operations 1510 to 1516) described in the processes and methods illustrated in FIGS. 7, 14, and 15 may be performed in a sequential, parallel, repetitive, or heuristic type. For example, the operations may be performed in a different order, some of the operations may be omitted, or other operations may be added.

According to various embodiments of the present disclosure, a method, by an electronic device including an image sensor that acquires an optical signal corresponding to an object and a controller that controls the image sensor, may include an operation of identifying a mode for generating an image corresponding to the object by using the optical signal, an operation of determining a setting of at least one image attribute to be used for generating the image at least based on the mode, an operation of generating image data by using pixel data corresponding to the optical signal at least based on the setting, and an operation of displaying the image corresponding to the object through a display that is functionally connected to the electronic device at least based on the image data.

According to various embodiments of the present disclosure, the operation of determining the setting may include an operation of determining a first setting of the at least one image attribute as the setting when the mode corresponds to a first mode, and an operation of determining a second setting of the at least one image attribute as the setting when the mode corresponds to a second mode.

According to various embodiments of the present disclosure, the mode may include a first mode in which a plurality of subpixels included in at least one of a plurality of unit pixels of the image sensor output pixel data of a subpixel level, respectively, a second mode in which image data of a unit pixel level is output through a combination of the pixel data of the plurality of subpixels within the unit pixel, a third mode in which information for calculating a phase difference between the plurality of subpixels is generated and image data of the unit pixel level is output by combining or averaging signals of a level of the plurality of subpixels, and a fourth mode in which information for calculating a phase difference between the plurality of subpixels is generated and image data of the unit pixel level is output by selectively combining or averaging pixel data of the plurality of subpixels.

According to various embodiments of the present disclosure, information corresponding to the phase difference between the plurality of subpixels may be output based on the first mode.

According to various embodiments of the present disclosure, image data may be output and information corresponding to the phase difference between the plurality of subpixels may not be output based on the second mode.

According to various embodiments of the present disclosure, image data and information corresponding to the phase difference between the plurality of subpixels may be output based on the third mode.

According to various embodiments of the present disclosure, image data generated by combining pixel data of subpixels within a first unit pixel, information for calculating or averaging a phase difference between pixels using pixel data acquired from subpixels within a second unit pixel, and image data generated by combining or averaging the acquired pixel data may be output based on the fourth mode.

According to various embodiments of the present disclosure, the first unit pixel may include a Red (R) pixel or Blue (B) pixel, and the second unit pixel may include a Green (G) pixel.

According to various embodiments of the present disclosure, the operation of generating the image data may include an operation of acquiring pixel data corresponding to an object at least based on an optical signal, an operation of identifying a setting of at least one image attribute to be used for generating an image corresponding to the object, an operation of, when the setting meets predetermined conditions, determining a phase difference of the image by using a first signal corresponding to the first subpixel and a second signal corresponding to the second subpixel, and an operation of, when the setting does not meet the predetermined conditions, refraining from determining the phase difference.

According to various embodiments of the present disclosure, when the setting meets the predetermined conditions, an operation of generating the image of a subpixel level by using the first signal and the second signal may be included. For example, when the setting meets the predetermined conditions, the controller 440 may generate an image of a subpixel level of each of the first signal and the second signal.

According to various embodiments of the present disclosure, when the setting does not meet the predetermined conditions, an operation of generating the image of a unit pixel level by combining the first signal and the second signal may be included.

According to various embodiments of the present disclosure, a case where the setting may not meet the predetermined conditions may include a case where the setting meets another predetermined condition.

According to various embodiments of the present disclosure, the at least one image attribute may include a frame rate, and a case where the setting meets the predetermined conditions may include a case where the setting of the at least one image attribute corresponds to a low frame rate and a case where the setting does not meet the predetermined conditions may include a case where the setting of the at least one image attribute corresponds to a high frame rate.

According to various embodiments of the present disclosure, the at least one image attribute may include a size of the object, a distance between the object and the image sensor, a movement speed of the object, or a combination thereof.

According to various embodiments of the present disclosure, a photodiode corresponding to each of the first subpixel and the second subpixel may be included.

According to various embodiments of the present disclosure, the operation of generating the image data may include an operation of acquiring an optical signal corresponding to an object through an image sensor, the image sensor including a plurality of unit pixels, at least one of the plurality of unit pixels including a first subpixel and a second pixel, an operation of acquiring pixel data corresponding to the object at least based on an optical signal by using the image sensor, an operation of identifying a setting of at least one image attribute to be used for generating an image corresponding to the object, an operation of determining a phase difference of the image by using a first signal corresponding to the first subpixel and a second signal corresponding to the second subpixel when the setting meets predetermined conditions, and an operation of refraining from determining the phase difference when the setting does not meet the predetermined conditions.

According to various embodiments of the present disclosure, when the setting meets the predetermined conditions, an operation of generating the image of a subpixel level by using the first signal and the second signal may be included.

According to various embodiments of the present disclosure, when the setting does not meet the predetermined conditions, an operation of generating the image of a unit pixel level by combining the first signal and the second signal may be included.

According to various embodiments of the present disclosure, a case where the setting may not meet the predetermined conditions may include a case where the setting meets another predetermined condition.

According to various embodiments of the present disclosure, the at least one image attribute may include a frame rate, and a case where the setting meets the predetermined conditions may include a case where the setting of the at least one image attribute corresponds to a low frame rate and a case where the setting does not meet the predetermined conditions may include a case where the setting of the at least one image attribute corresponds to a high frame rate.

According to various embodiments of the present disclosure, the at least one image attribute may include a size of the object, a distance between the object and the image sensor, a movement speed of the object, or a combination thereof.

According to various embodiments of the present disclosure, photodiodes corresponding to the first subpixel and the second subpixel may be included.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (e.g., modules or functions thereof) or the method (e.g., operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a DVD), magneto-optical media (e.g., a floptical disk), a hardware device (e.g., a read only memory (ROM), a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

According to various embodiments of the present disclosure, a storage medium having instructions stored therein is provided. The instructions are configured to allow one or more processors to perform one or more operations when being executed by the one or more processors. The one or more operations, by an electronic device including an image sensor that acquires an optical signal corresponding to an object and a controller that controls the image sensor, an operation of identifying a mode for generating an image corresponding to the object by using the optical signal, an operation of determining a setting of at least one image attribute to be used for generating the image at least based on the mode, an operation of generating image data by using pixel data corresponding to the optical signal at least based on the setting, and an operation of displaying the image corresponding to the object through a display functionally connected to the electronic device at least based on the image data.

According to various embodiments of the present disclosure, a storage medium having instructions stored therein is provided. The instructions are configured to allow one or more processors to perform one or more operations when being executed by the one or more processors. The one or more operations may include an operation of acquiring pixel data corresponding to an object at least based on an optical signal by using an image sensor including a plurality of unit pixels, at least one unit pixel including a first subpixel and a second subpixel for acquiring the optical signal corresponding to the object, an operation of identifying a setting of at least one image attribute to be used for generating an image corresponding to the object, an operation of determining a phase difference of the image by using a first signal corresponding to the first subpixel and a second signal corresponding to the second subpixel when the setting meets predetermined conditions, and an operation of refraining from determining the phase difference when the setting does not meet the predetermined conditions.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus comprising:
    a memory;
    a processor;
    a display; and
    a camera module comprising:
        an image sensor including a plurality of unit pixels, each unit pixel of the plurality of unit pixels comprising a first subpixel and a second subpixel, and
        a controller electrically connected with the processor via an interface, the controller being configured to:
            obtain a plurality of unit pixel signals from the plurality of unit pixels, the plurality of unit pixel signals comprising a first subpixel signal corresponding to the first subpixel and a second subpixel signal corresponding to the second subpixel,
            generate, for each unit pixel of the plurality of unit pixels, phase difference information based at least in part on a difference between the first subpixel signal and the second subpixel signal from each unit pixel of the plurality of unit pixels,
            generate a plurality of image data using the plurality of unit pixel signals, and
            transmit the plurality of image data and the phase difference information via the interface to the processor,
    wherein the processor is configured to present the plurality of image data via the display and adjust a focus with respect to the camera module using the phase difference information,
    wherein the plurality of unit pixels are all unit pixels included in the image sensor,
    wherein the plurality of unit pixel signals are read out from the plurality of unit pixels, respectively, and
    wherein each of the plurality of image data corresponds to each of all the unit pixels.

2. The apparatus of claim 1,
    wherein the interface comprises a mobile industry processor interface (MIPI) including a first transmission channel and a second transmission channel,
    wherein the plurality of image data are transmitted via the first transmission channel, and
    wherein the phase difference information is transmitted via the second transmission channel.

3. The apparatus of claim 1, wherein at least one portion of the plurality of image data is generated based on a summation of the first subpixel signal and the second subpixel signal.

4. The apparatus of claim 1,
    wherein a first unit pixel of the plurality of unit pixels corresponds to at least one of a red color channel or a blue color channel, and
    wherein the first unit pixel is configured to accumulate an accumulate signal from the first subpixel and the second subpixel of the first unit pixel.

5. The apparatus of claim 4,
    wherein a second unit pixel of the plurality of unit pixels corresponds to a green color channel, and
    wherein the second unit pixel is configured to generate a first green subpixel signal corresponding to the first subpixel signal and a second green subpixel signal corresponding to the second subpixel signal.

6. The apparatus of claim 4, wherein the controller is further configured to, at least in part of the generating of the plurality of image data, generate first image data of the plurality of image data using at least the accumulate signal read out from the first unit pixel.

7. The apparatus of claim 1, wherein the controller is further configured to:
    identify a mode for the generating of the plurality of image data,
    determine a type of phase difference calculation, from among a plurality of types of phase difference calculations, based on the mode, and
    selectively perform the generating of the phase difference information based at least in part on the type of phase difference calculation.

8. The apparatus of claim 1,
wherein a first portion of the plurality of unit pixel signals is generated based on a first exposure time and a second portion of the plurality of unit pixel signals is generated based on a second exposure time longer than the first exposure time, and
wherein the controller is further configured to, at least in part of the generating of the phase difference information, generate the phase difference information using the second portion of the plurality of unit pixel signals.

9. A method for operating an electronic device, the method comprising:
obtaining, by a controller included in a camera module of the electronic device, from an image sensor including a plurality of unit pixels, a plurality of unit pixel signals, each unit pixel of the plurality of unit pixels comprising a first subpixel and a second subpixel, the plurality of unit pixel signals comprising a first subpixel signal corresponding to the first subpixel and a second subpixel signal corresponding to the second subpixel;
generating, by the controller, for each unit pixel of the plurality of unit pixels, phase difference information based at least in part on a difference between the first subpixel signal and the second subpixel signal from each unit pixel of the plurality of unit pixels;
generating, by the controller, a plurality of image data using the plurality of unit pixel signals; and
transmitting, by the controller, the plurality of image data and the phase difference information via an interface electrically coupling the controller to a processor of the electronic device such that the processor presents the plurality of image data via a display and adjusts a focus with respect to the camera module using the phase difference information,
wherein the plurality of unit pixels are all unit pixels included in the image sensor,
wherein the plurality of unit pixel signals are read out from the plurality of unit pixels, respectively, and
wherein each of the plurality of image data corresponds to each of all the unit pixels.

10. The method of claim 9,
wherein the interface comprises a mobile industry processor interface (MIPI) including a first transmission channel and a second transmission channel, and
wherein the method further comprises transmitting the plurality of image data via the first transmission channel and the phase difference information via the second transmission channel.

11. The method of claim 9, wherein at least one portion of the plurality of image data is generated based on a summation of the first subpixel signal and the second subpixel signal.

12. The method of claim 9, wherein the obtaining comprises:
obtaining, as at least a part of the plurality of unit pixel signals, accumulated signals from a first unit pixel group of the plurality of unit pixels, the accumulated signals being generated in the first unit pixel group based on an accumulation of the first subpixel signal and the second subpixel signal of the first unit pixel group; and
obtaining, as at least another part of the plurality of unit pixel signals, individual subpixel signals from a second unit pixel group of the plurality of unit pixels, the subpixel signals being acquired from the first subpixel and the second subpixel of the second unit pixel group, respectively.

13. The method of claim 12,
wherein the generating of the phase difference information comprises generating first phase difference information of the phase difference information using the individual subpixel signals,
wherein the generating of the plurality of image data comprises generating first image data of the plurality of image data using the accumulated signals and the individual subpixel signals, and
wherein the individual subpixel signals from at least one part of the second unit pixel group are summed after the generating of the first phase difference information to be used for the generating of the plurality of image data.

14. The method of claim 12,
wherein a plurality of color channels comprises at least a red color channel, a blue color channel, and a green color channel,
wherein the first unit pixel group corresponds to at least one of the red color channel or the blue color channel, and
wherein the second unit pixel group corresponds to at least the green color channel.

15. The method of claim 9, further comprising:
identifying a mode for the generating of the plurality of image data; and
determining a type of phase difference calculation, from among at least two types of phase difference calculations, based on the mode,
wherein the generating of the phase difference information is performed selectively based at least in part on the type of phase difference calculation.

16. The method of claim 9,
wherein a first portion of the plurality of unit pixel signals is generated based on a first exposure time and a second portion of the plurality of unit pixel signals is generated based on a second exposure time longer than the first exposure time, and
wherein the generating of the phase difference information comprises generating the phase difference information using the second portion of the plurality of unit pixel signals.

17. An apparatus comprising:
a memory;
a processor;
a display; and
a camera module comprising:
an image sensor including a plurality of unit pixels, the plurality of unit pixels including a plurality of subpixels, the image sensor being configured to acquire an optical signal corresponding to an external object, and
a controller electrically connected with the processor via an interface, the controller being configured to:
identify a mode for generating an image corresponding to the external object by using the optical signal;
determine a setting of at least one image attribute to be used for generating the image at least based on the mode;
generate image data by using pixel data corresponding to the optical signal at least based on the setting, wherein a type of phase difference calculation, from among at least two types of phase difference calculations, used on the pixel data is determined based on the mode; and transmit the image data through the interface to the processor, wherein the processor is configured to display the image data through the display.

18. The apparatus of claim 17, wherein the controller is further configured to:

based on the mode corresponding to a first predefined mode, generate phase difference information corresponding to a phase difference between the plurality of subpixels, and based on the mode corresponding to a second predefined mode, refrain from generating the phase difference information.

19. The apparatus of claim 18, wherein the controller is further configured to transmit the image data and the phase difference information in an interlaced manner through the interface.

20. The apparatus of claim 18, wherein the controller is further configured to:

generate the image data based at least in part on a combination of pixel data of subpixels within a first unit pixel group of the plurality of unit pixels, and generate the phase difference information based on calculating a phase difference between pixels using pixel data acquired from subpixels within a second unit pixel group of the plurality of unit pixels.

* * * * *